United States Patent
Aronovich et al.

(10) Patent No.: US 10,102,231 B2
(45) Date of Patent: Oct. 16, 2018

(54) ORDERING HETEROGENEOUS OPERATIONS IN BULK PROCESSING OF TREE-BASED DATA STRUCTURES

(71) Applicant: International Business Machines Corporation, Armonk, NY (US)

(72) Inventors: Lior Aronovich, Thornhill (CA); Kien K. Huynh, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

(21) Appl. No.: 14/918,168

(22) Filed: Oct. 20, 2015

(65) Prior Publication Data
US 2017/0109385 A1 Apr. 20, 2017

(51) Int. Cl.
*G06F 17/30* (2006.01)

(52) U.S. Cl.
CPC .. *G06F 17/30327* (2013.01); *G06F 17/30286* (2013.01); *G06F 17/30011* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 5,230,047 A * | 7/1993 | Frey, Jr. | G06F 17/30091 707/E17.012 |
| 5,897,638 A | 4/1999 | Lasser et al. | |
| 6,026,406 A | 2/2000 | Huang et al. | |
| 6,694,323 B2 | 2/2004 | Bumbulis | |
| 7,761,434 B2 | 7/2010 | Surtani et al. | |
| 7,809,759 B1 | 10/2010 | Bruso et al. | |

(Continued)

FOREIGN PATENT DOCUMENTS

| | | |
|---|---|---|
| CN | 101576915 A | 11/2009 |
| CN | 103324466 A | 9/2013 |

(Continued)

OTHER PUBLICATIONS

Graefe, G. "Sorting and Indexing With Partitioned B-Trees," Proceedings of the 2003 CIDR Conference, vol. 3, 2003, pp. 1-13.

(Continued)

*Primary Examiner* — Hung Le
(74) *Attorney, Agent, or Firm* — Zilka-Kotab, P.C.

(57) ABSTRACT

Computer implemented methods for concurrent processing of operations on a tree-based data structure include: receiving input at a storage system managing a storage device in which the tree-based data structure is stored, the input identifying a set of heterogeneous operations to be applied to the tree-based data structure; determining one or more nodes of the tree-based data structure to which one or more of the set of heterogeneous operations are to be applied; determining one or more groups of the set of heterogeneous operations according to the one or more nodes to which the set of heterogeneous operations are to be applied; and applying, for each of the one or more groups, the set of heterogeneous operations according to a predefined order. Systems and methods for accomplishing the same are also disclosed.

25 Claims, 11 Drawing Sheets

(56) References Cited

U.S. PATENT DOCUMENTS

| | | | |
|---|---|---|---|
| 7,984,450 B2* | 7/2011 | Almasi | G06F 13/387 718/106 |
| 8,209,353 B2 | 6/2012 | Krishnamurthy | |
| 8,370,394 B2 | 2/2013 | Atta et al. | |
| 8,650,219 B2 | 2/2014 | Bachar et al. | |
| 8,880,488 B1 | 11/2014 | Xie et al. | |
| 9,003,162 B2 | 4/2015 | Lomet et al. | |
| 2004/0216058 A1* | 10/2004 | Chavers | G06F 3/0481 715/810 |
| 2006/0059440 A1* | 3/2006 | Pry | G06F 17/30864 715/838 |
| 2006/0282438 A1* | 12/2006 | Zhou | G06F 17/30961 |
| 2007/0168859 A1* | 7/2007 | Fortes | G06F 17/211 715/700 |
| 2009/0138892 A1* | 5/2009 | Almasi | G06F 13/387 719/313 |
| 2010/0076940 A1* | 3/2010 | Bordawekar | G06F 17/30961 707/704 |
| 2010/0146003 A1* | 6/2010 | Bruso | G06F 17/30327 707/797 |
| 2011/0320496 A1* | 12/2011 | Reid | G06F 17/30356 707/797 |
| 2012/0084281 A1* | 4/2012 | Colosi | H04L 29/12632 707/723 |
| 2013/0185271 A1 | 7/2013 | Strain et al. | |
| 2013/0204902 A1* | 8/2013 | Wang | G06F 17/30327 707/797 |
| 2013/0339395 A1* | 12/2013 | Sewall | G06F 17/30327 707/797 |
| 2014/0074841 A1* | 3/2014 | Majnemer | G06F 17/30327 707/737 |
| 2014/0310317 A1 | 10/2014 | Spillane et al. | |
| 2015/0286664 A1* | 10/2015 | Narasimhamurthy | G06F 17/30224 707/797 |
| 2016/0070820 A1* | 3/2016 | Laine | G06T 15/005 707/797 |
| 2017/0109352 A1 | 4/2017 | Aronovich et al. | |
| 2017/0111442 A1 | 4/2017 | Aronovich et al. | |
| 2017/0116314 A1* | 4/2017 | Aoun | G06F 17/30598 |

FOREIGN PATENT DOCUMENTS

| | | |
|---|---|---|
| CN | 103365852 A | 10/2013 |
| CN | 103765381 A | 4/2014 |

OTHER PUBLICATIONS

Bayer, R. et al. "Organization and Maintenance of Large Ordered Indexes," Acta Informatica, vol. 1, 1972, pp. 173-189.

Van Den Bercken, J. et al. "An Evaluation of Generic Bulk Loading Techniques," Proceedings of the 27th VLDB Conference, 2001, pp. 1-10.

Comer, D. "The Ubiquitous B-Tree," Computing Surveys, vol. 11, No. 2, Jun. 1979, pp. 121-137.

Shavit, N. "Data Structures in the Multicore Age," Communications of the ACM, vol. 54, No. 3, Mar. 2011, pp. 76-84.

Moir, M. "Concurrent Data Structures," Handbook of Data Structures and Applications, 2001, pp. 1-34.

Roh, H. et al. "B+-tree index optimization by exploiting internal parallelism of flash-based solid state drives," Proceedings of the VLDB Endowment, vol. 5, No. 4, 2011, pp. 286-297.

List of IBM Patents or Patent Applications Treated as Related.

Aronovich et al., U.S. Appl. No. 14/918,069, filed Oct. 20, 2015.

Aronovich et al., U.S. Appl. No. 14/918,130, filed Oct. 20, 2015.

International Search Report and Written Opinion from PCT Application No. PCT/IB2016/054899, dated Dec. 13, 2016.

Non-Final Office Action from U.S. Appl. No. 14/918,130, dated Jan. 19, 2018.

Non-Final Office Action from U.S. Appl. No. 14/918,069, dated Dec. 8, 2017.

Final Office Action from U.S. Appl. No. 14/918,069, dated May 24, 2018.

Notice of Allowance from U.S. Appl. No. 14/918,130, dated Jul. 3, 2018.

* cited by examiner

ORDERING HETEROGENEOUS OPERATIONS IN BULK PROCESSING OF TREE-BASED DATA STRUCTURES

BACKGROUND

The present invention relates to processing of data structures, and more specifically, this invention relates to efficient concurrent bulk processing of data organized in tree-based data structures, e.g. paged search tree data structures, as well as processing of the data structures themselves.

Data stored on a conventional storage system is organized according to one of a plethora of known data structures. Most commonly, the data are organized according to tree-based data structures, such as paged search trees, which constitute a bifurcating network of nodes that store data and/or routing information to facilitate searching for data of interest. In a paged search tree, each node typically corresponds to a disk page.

Accordingly, it would be beneficial to provide a system and techniques for improving the efficiency of tree-based data structure modifications, in order to improve the functioning and throughput of a broad range of data storage systems by increasing input/output (I/O) efficiency, and reducing computational costs of storing, organizing, searching for and updating data entries and the corresponding data structures.

SUMMARY

In one embodiment, a computer implemented method for concurrent processing of operations on a tree-based data structure includes: receiving input at a storage system managing a storage device in which the tree-based data structure is stored, the input identifying a set of heterogeneous operations to be applied to the tree-based data structure; determining one or more nodes of the tree-based data structure to which one or more of the set of heterogeneous operations are to be applied; determining one or more groups of the set of heterogeneous operations according to the one or more nodes to which the set of heterogeneous operations are to be applied; and applying, for each of the one or more groups, the set of heterogeneous operations according to a predefined order.

In another embodiment, a computer program product for concurrent processing of operations on a tree-based data structure includes a computer readable storage medium having program instructions embodied therewith. The computer readable storage medium is not a transitory signal per se, and the program instructions are executable by a storage system manager to cause the storage system manager to perform a method. The method includes receiving input at a storage system manager managing a storage device in which the tree-based data structure is stored, the input identifying a set of heterogeneous operations to be applied to the tree-based data structure; determining, by the storage system manager, one or more nodes of the tree-based data structure to which one or more of the set of heterogeneous operations are to be applied; determining, by the storage system manager, one or more groups of the set of heterogeneous operations according to the one or more nodes to which the set of heterogeneous operations are to be applied; and applying, by the storage system manager and for each of the one or more groups, the set of heterogeneous operations according to a predefined order.

In yet another embodiment, a storage system for concurrent processing of operations on a tree-based data structure includes a storage system manager, and logic integrated with and/or executable by the storage system manager. The logic is configured to cause the storage system to: receive input at a storage system managing a storage device in which the tree-based data structure is stored, the input identifying a set of heterogeneous operations to be applied to one or more nodes of the tree-based data structure; determine the one or more nodes of the tree-based data structure to which one or more of the set of heterogeneous operations are to be applied; determine one or more groups of the set of heterogeneous operations that are to be applied to a common set of the one or more nodes; and apply, for each of the one or more groups, the set of heterogeneous operations to the one or more nodes to which the set of heterogeneous operations are to be applied by the storage system manager and according to a predefined order.

Other aspects and embodiments of the present invention will become apparent from the following detailed description, which, when taken in conjunction with the drawings, illustrate by way of example the principles of the invention.

DETAILED DESCRIPTION

Figure 1:
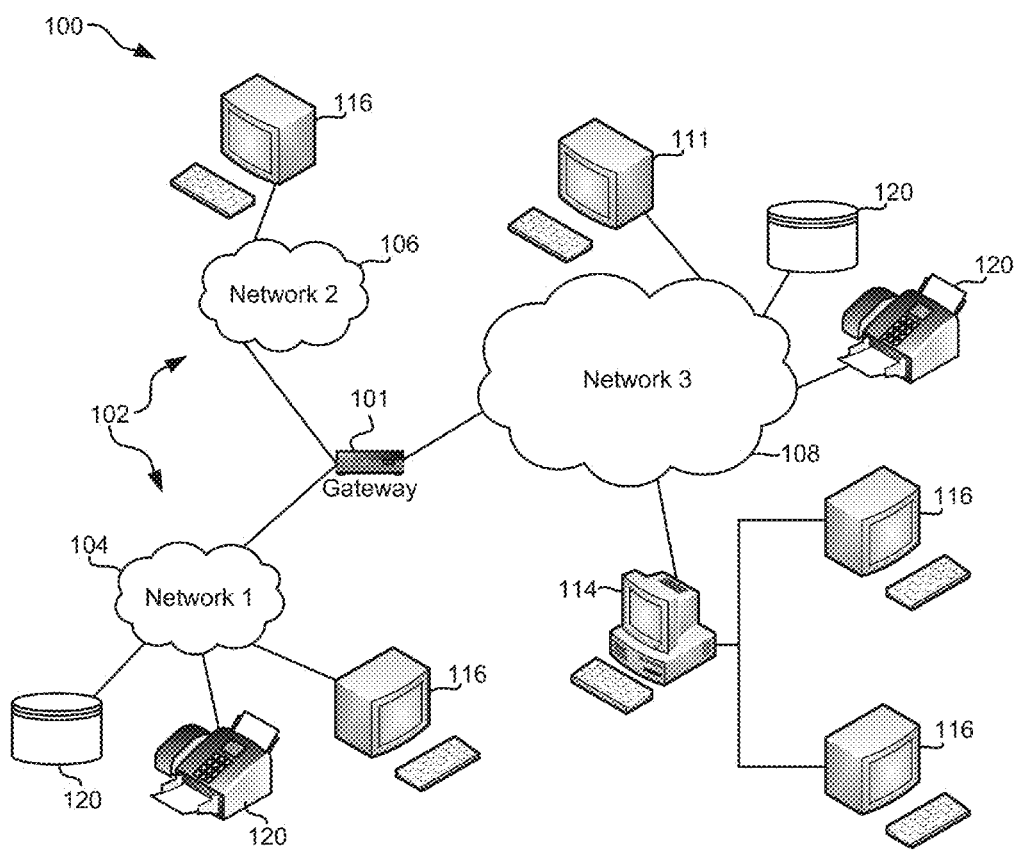
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for efficient manipulation of tree-based data structures using bulk, concurrent processing of heterogeneous operation types.

In one general embodiment, a computer implemented method for concurrent processing of operations on a tree-based data structure includes: receiving input at a storage system managing a storage device in which the tree-based data structure is stored, the input identifying a set of heterogeneous operations to be applied to the tree-based data structure; determining one or more nodes of the tree-based data structure to which one or more of the set of heterogeneous operations are to be applied; determining one or more groups of the set of heterogeneous operations according to the one or more nodes to which the set of heterogeneous operations are to be applied; and applying, for each of the one or more groups, the set of heterogeneous operations according to a predefined order In another general embodiment, a computer program product for concurrent processing of operations on a tree-based data structure includes a computer readable storage medium having program instructions embodied therewith. The computer readable storage medium is not a transitory signal per se, and the program instructions are executable by a storage system manager to cause the storage system manager to perform a method. The method includes receiving input at a storage system manager managing a storage device in which the tree-based data structure is stored, the input identifying a set of heterogeneous operations to be applied to the tree-based data structure; determining, by the storage system manager, one or more nodes of the tree-based data structure to which one or more of the set of heterogeneous operations are to be applied; determining, by the storage system manager, one or more groups of the set of heterogeneous operations according to the one or more nodes to which the set of heterogeneous operations are to be applied; and applying, by the storage system manager and for each of the one or more groups, the set of heterogeneous operations according to a predefined order.

In yet another general embodiment, a storage system for concurrent processing of operations on a tree-based data structure includes a storage system manager, and logic integrated with and/or executable by the storage system manager. The logic is configured to cause the storage system to: receive input at a storage system managing a storage device in which the tree-based data structure is stored, the input identifying a set of heterogeneous operations to be applied to one or more nodes of the tree-based data structure; determine the one or more nodes of the tree-based data structure to which one or more of the set of heterogeneous operations are to be applied; determine one or more groups of the set of heterogeneous operations that are to be applied to a common set of the one or more nodes; and apply, for each of the one or more groups, the set of heterogeneous operations to the one or more nodes to which the set of heterogeneous operations are to be applied by the storage system manager and according to a predefined order.

Definitions

Adjacent Nodes

As understood herein, nodes within a tree-based data structure are adjacent to immediately neighboring nodes of the same layer in the tree, where all the nodes of a same tree layer have the same distance from the root node of a tree, and adjacent nodes may or may not descend from a same parent node in the next upper tree layer. Adjacent nodes of a particular layer are also termed sibling nodes.

Concurrent Bulk Processing

As understood herein, concurrent bulk processing involves simultaneous processing of multiple operations on a tree-based data structure. Operations are processed concurrently when processing thereof occurs during a same time window. Operations are processed in bulk when multiple operations are processed together (rather than individually) during the same time window.

In various embodiments, concurrent bulk processing includes simultaneous, independent processing of multiple nodes of a tree-based data structure, belonging to a same layer of the tree. In particularly preferred embodiments, concurrent bulk processing involves processing all nodes of a particular layer of a tree-based data structure in parallel using independent operation threads.

Heterogeneous Operations

As understood herein, heterogeneous operations are inclusive of any two or more different types of operations which may be performed to modify or process data stored in a tree-based data structure, and/or modify or process the organization of the tree-based data structure itself. Exemplary operations include updating, inserting or removing data entries and/or routing entries stored in nodes of a tree-based data structure, as would be understood by one having ordinary skill in the art upon reading the present descriptions.

Accordingly, a set of heterogeneous operations includes any two or more of the exemplary variety of operations described herein. In preferred embodiments, heterogeneous operations pertain to data entries rather than tree nodes. In particularly preferred embodiments, heterogeneous operations pertain to leaf nodes rather than internal nodes.

Node Deletion

As understood herein, node deletion involves eliminating a node from the tree-based data structure.

In various embodiments, node deletion may be performed following a node merger, e.g. removing the node emptied as a result of a merger of its contents into another node in the data structure. Node deletion may include, for example, modifying and/or removing routing entries in node(s) belonging to one or more layers from which the deleted node descends from.

Node Insertion

As understood herein, node insertion involves the creation of a previously nonexistent node within the tree-based data structure.

In various embodiments, node insertion may be performed in response to determining one or more nodes in a particular layer are over-filled, e.g. by moving data entries from the over-filled node to the new inserted node.

Node Merging

As understood herein, node merger involves combining two or more existing nodes to form a single node.

In various embodiments, merging may be performed in response to determining an under-filled node exists or will exist (e.g. as a result of performing the heterogeneous operation(s) on a particular layer of the data structure). Node merger is preferably accomplished by combining the under-filled node with a sibling node.

Node Permission

A user may obtain permission to access a specific node of a tree-based data structure, atomically with respect to all other users operating on the same data structure.

The permission may be shared, in which case the node may be only read. Read-only, shared permission can be obtained concurrently by multiple users.

Alternatively the permission may be exclusive, in which case the node may be also modified. Exclusive permission is mutual exclusive with other users accessing the node.

Node Re-balancing

As understood herein, node re-balancing includes transfer of data entries from a full node to its sibling nodes, or to an under-filled node from its sibling nodes, to maintain the nodes in a required storage utilization range.

In various embodiments node re-balancing is particularly useful in to maintain an appropriate storage utilization level across the nodes of a tree-based data structure.

Accordingly, skilled artisans will appreciate based on these descriptions that node re-balancing may include or be followed by a process whereby routing information in the tree-based data structure is modified to accommodate any changes to the organization of the nodes and/or the location of the data entries, in preferred embodiments.

Node Splitting

As understood herein, a node split operation involves splitting a node into two or more nodes, at least one of which was not a part of the data structure prior to performing the split operation.

In various embodiments, node splitting may occur in response to determining an existing node of a tree-based data structure is or will become over-filled, e.g. as a result of performing one or more heterogeneous operations on a particular layer of the tree-based data structure, as would be understood by a person having ordinary skill in the art upon reading the present descriptions.

Node Update

Updating a node, as understood herein, includes one or more of modifying a data entry payload (e.g. for leaf nodes of a B+ tree), and modifying one or more routing entries stored in the node (e.g. for internal nodes of a B+ tree).

In various embodiments, node update may be performed in response to another operation causing a change in the data structure organization, which may require updating routing entries to accommodate the change.

Additionally and/or alternatively, a node may be updated to accomplish modification of a data entry stored in the node.

Storage Identifier

As understood herein, a storage identifier is a data element which identifies a node's location in a storage device.

In various embodiments, a node in a tree-based data structure is preferably associated with a unique storage identifier. For instance to point from node N1 to node N2 in a tree-based data structure, a storage identifier of node N2 is preferably stored in node N1.

Tree-based Data Structure

As understood herein, tree-based data structures include any variety of data structure in which data entries are stored and organized according to a branching hierarchical structure. Preferably, the structure branches in a bifurcating manner, but structures with higher order splitting are to be considered within the scope of the present disclosures, e.g. quadfurcating, octofurcating, etc. as would be understood by a person having ordinary skill in the art upon reading the present descriptions.

Paged Search Tree Data Structure

As understood herein, paged search tree data structures are designed for organization and search of data. In paged search tree data structures, data is stored in nodes, where a node typically corresponds to a disk page, and the nodes are organized and linked in a hierarchical tree structure. These data structures are designed to provide fast and efficient search within large data sets. Typically such data structures are stored on disk, and caches on faster storage (e.g. memory or solid state disk) are used to store portions of the data structure to improve the performance.

For instance, B+-trees are a variety of the paged search tree data structure. In a B+ tree data entries are stored exclusively in the leaf nodes, while internal nodes store routing information to direct operations towards the appropriate leaf nodes. Data entries stored in the leaf nodes include a key (to facilitate search) and a payload including the data of interest. Routing entries include a key and an internal link or node identifier used to direct operations toward appropriate leaf nodes.

Computer, Network, and Storage System Architecture

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
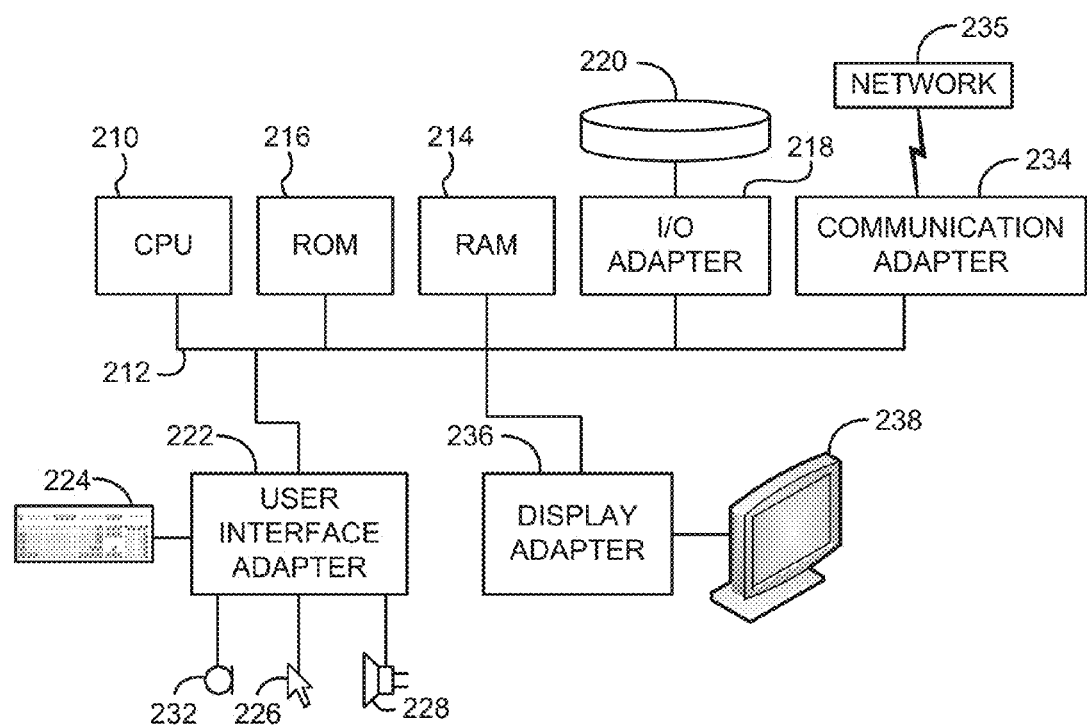
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
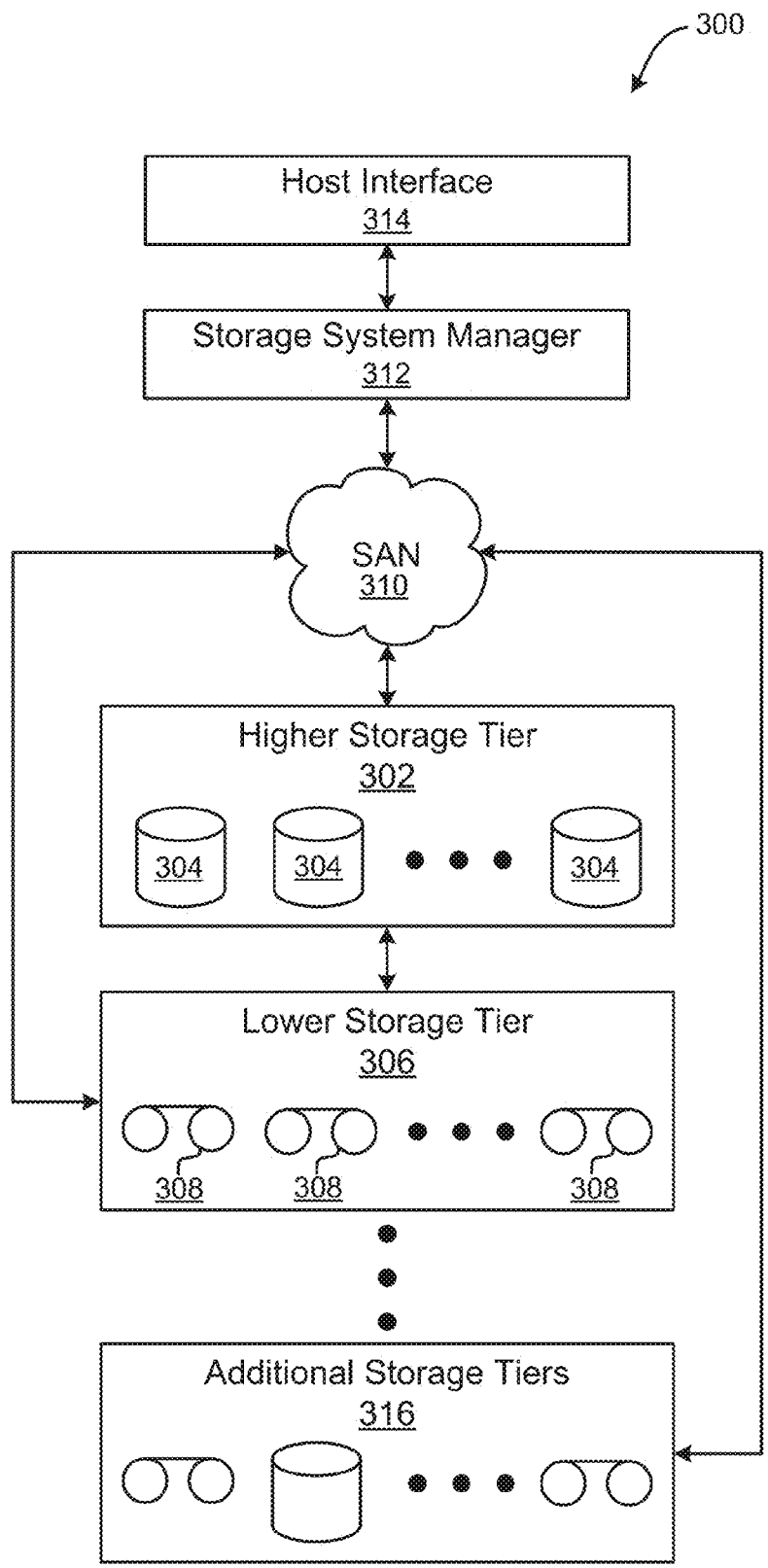
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one upper storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The upper storage tier(s) 306 may preferably include one or more upper performing storage media 308, including sequential access media such as magnetic tape in tape drives and/or optical media, supper accessing HDDs, supper accessing SSDs, etc., and/or others noted herein or known in the art. One or more additional storage tiers 316 may include any combination of storage memory media as desired by a designer of the system 300. Also, any of the higher storage tiers 302 and/or the upper storage tiers 306 may include some combination of storage devices and/or storage media.

The storage system manager 312 may communicate with the storage media 304, 308 on the higher storage tier(s) 302 and upper storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including upper storage tier 306 and additional storage tiers 316 may include any combination of SSDs, HDDs, tape drives, etc., for storing data in a upper performing storage environment. In this way, more frequently accessed data, data having a higher priority, data needing to be accessed more quickly, etc., may be stored to the higher storage tier 302, while data not having one of these attributes may be stored to the additional storage tiers 316, including upper storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a upper storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Exemplary Tree-Based Data Structures

In general, the presently disclosed inventive embodiments relate to the processing and update of tree-based data structures, with practical application to paged search trees typically leveraged to facilitate organization of data in a storage system. The discussion presented herein refers to the exemplary case of a paged search tree (e.g. a "B+ tree") in which all data entries are stored in terminal nodes of the data structure (i.e. "leaf nodes"), while all internal nodes (i.e. "branch nodes" and "root nodes") store routing information configured to facilitate traversing the tree structure during a search for particular data stored therein.

However, it should be understood that the scope of the present disclosures is not limited to B+ trees, B-trees, or any other particular variety of tree-based data structure. Rather, the presently disclosed inventive concepts may be applied to any suitable tree-based data structure that would be appreciated by a person having ordinary skill in the art upon reading the present descriptions.

Figure 4:
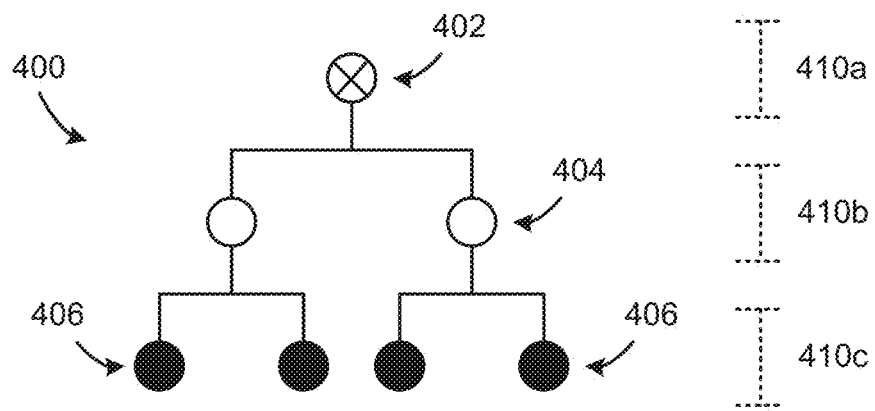
FIG. 4 is a simplified schematic of a balanced, three-layer paged search tree, according to one embodiment.

One exemplary embodiment of a tree-based data structure 400 is represented graphically in FIG. 4. In this embodiment, the tree 400 is a three-layer, balanced data structure. The upper-most layer of the tree (root layer 410a) includes a root node 402 from which all other nodes in the tree descend. The first node layer 410b of the tree 400, immediately below root node 402, includes two internal nodes 404 which bifurcate from root node 402. In embodiments where the tree 400 is a B+ tree, these internal nodes 404 include routing information, but not data entries. Rather, in a B+ tree embodiment of FIG. 4 the data entries are stored exclusively in the leaf nodes 406, which are located in the second node layer 410c, immediately below the first node layer as shown in FIG. 4. Of course, skilled artisans will appreciate that in other embodiments the tree 400 may not be a B+ tree but some other suitable form of tree-based data structure, and which may store data entries in internal nodes 404 as well as leaf nodes 406.

Figure 5:
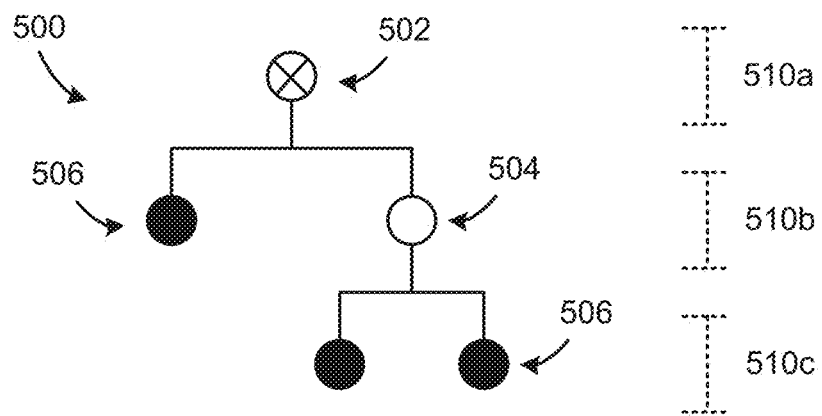
FIG. 5 is a simplified schematic of an unbalanced, three-layer paged search tree, according to one embodiment.

A similar tree-based data structure 500 is shown in FIG. 5, but according to the depicted embodiment the tree 500 is unbalanced. As with FIG. 4, the tree 500 comprises a root layer 510a having a root node 502, a first node layer 510b below the root node layer and a second node layer 510c below the first node layer. However, as shown in FIG. 5, the tree 500 is asymmetric, and includes one internal node 504 in the first node layer 510b, but also includes leaf nodes 506 in multiple node layers 510b, 510c of the tree 500. In practice, and according to various embodiments the presently disclosed inventive embodiments are equally applicable to both symmetric and asymmetric tree types.

With continuing reference to FIGS. 4 and 5, and as understood herein the first node layer 410b, 510b of each tree 400, 500, respectively includes two horizontally adjacent sibling nodes (see nodes 404, as shown in FIG. 4; nodes 504 and 506 as shown in FIG. 5). Since these sibling nodes each descend directly from the corresponding root node 402, 502, they are also vertically adjacent to their respective root node.

However, sibling nodes need not necessarily descend from the same ancestor node, in some embodiments. For example, as shown in FIG. 4 second node layer 410c includes four leaf nodes 406, which may be considered to include three sets of sibling nodes: the two left-most sibling nodes descend from the left-most internal node 404 in the first node layer 410b. The two right-most sibling nodes descend from the right-most internal node 404 in the first node layer 410b. Each of the middle two sibling nodes descend from a different parent node, one from the left-most internal node 404 in the first node layer 410b and the other from the right-most internal node 404 in the first node layer 410b. In various embodiments, all such horizontally and immediately adjacent pairs of nodes in a particular node layer are to be considered siblings.

Figure 6:
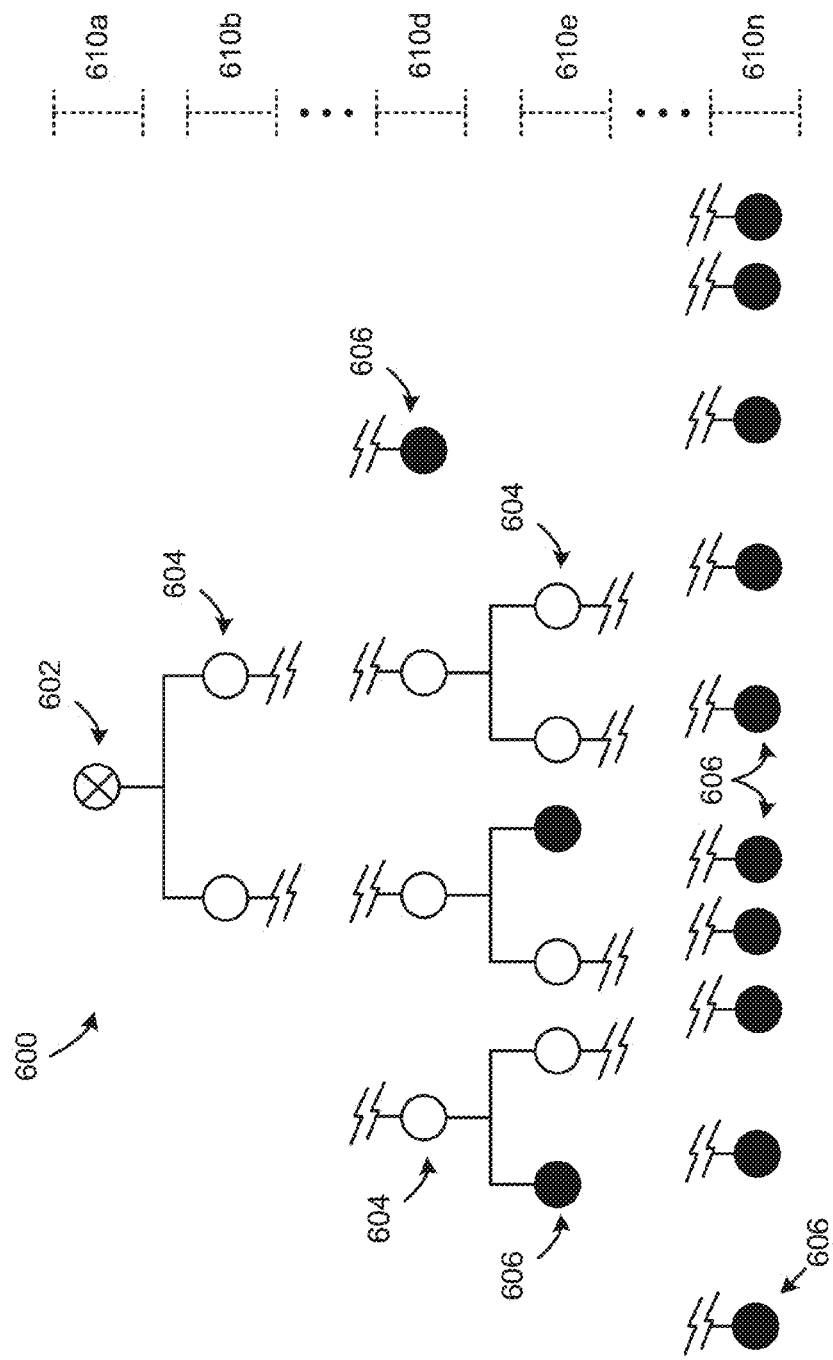
FIG. 6 is a simplified schematic of an unbalanced, multi-layer paged search tree, according to one embodiment.

Similarly, and as demonstrated via FIG. 6, the presently disclosed inventive embodiments are applicable to, and useful in the context of, much more complex tree structures, e.g. an asymmetric tree having n layers such as tree-based data structure 600. In one embodiment according to the structure shown in FIG. 6, the tree 600 has a root node 602 in a root node layer 610a, and two internal nodes 604 in a first node layer 610b immediately below the root node layer 610a.

The next node layer, which in some embodiments may be designated a second node layer 610d, is below the first node layer and may include both internal node(s) 604 and leaf node(s) 606. In various embodiments, the n-layered tree 600 may have any number of intervening additional layers (not shown) each having internal nodes 604 and/or leaf nodes 606 positioned between the first node layer 610b and the second node layer 610d, and/or between the third node layer 610e and the terminal node layer 610n, as indicated in FIG. 6 via the broken jagged lines separating the branches between the first node layer 610b and the second node layer 610d and between the third node layer 610e and the terminal node layer 610n.

In preferred approaches the presently disclosed algorithms are implemented in storage systems and/or architectures having optimal minimum and maximum fan-out characteristics, i.e. the tree-based data structures implemented by the storage system and/or architecture are balanced, and optimize the number of nodes per layer of the tree so as to optimize the number of layers in the tree. In addition, in preferred approaches the algorithms are applied to B+ trees having such fan-out characteristics.

Advantageously, employing data structures having fan-out characteristics as described above typically permits bulk concurrent processing of heterogeneous operations to data entries, as well as commensurate modifications to tree structure, to be accomplished in three or fewer update phase iterations, as described in further detail below. This particularly efficient process further improves the functioning of the storage systems implementing the presently disclosed techniques by reducing computational cost and performance time for manipulation of data and the tree-based data structures themselves, according to multiple approaches.

Concurrent Bulk Processing of Tree-Based Data Structures

As noted below, conventional techniques for processing data and tree-based data structures such as paged search trees have yet to solve the problem of efficient concurrent processing of data stored in/via the tree. A unique approach presented herein proposes the use of concurrent bulk processing of heterogeneous operation types to reduce I/O and processor costs associated with typical techniques for processing of data stored in/via the tree, and processing of the tree structure. In brief, since the presently disclosed inventive techniques enable the processing of heterogeneous operation types in bulk, determine necessary minimal structural changes to the tree, and propagate those necessary minimal structural changes up the tree in the process of modifying the data and/or tree structure, a significant efficiency improvement is provided.

The presently disclosed inventive concepts provide techniques for performing heterogeneous operations on data entries in a data structure such as a paged search tree, as well as making any necessary modifications to the organization of the data structure resulting from performing the heterogeneous operations. The presently disclosed inventive concepts are unique in that heterogeneous operations processing is performed concurrently and in bulk for each layer of the tree data structure, significantly reducing the number and cost of processing and I/O operations necessary to perform the set of heterogeneous operations.

In general, the techniques described herein accomplish the aforementioned concurrent bulk processing using a two-phase approach. First, a search phase traverses the tree data structure, and locates the leaf nodes to which one or more of an input set of heterogeneous operations should be applied. Second, an update phase traverses the tree data structure in a layer-wise iterative fashion proceeding from the leaves layer to the root.

Figure 7:
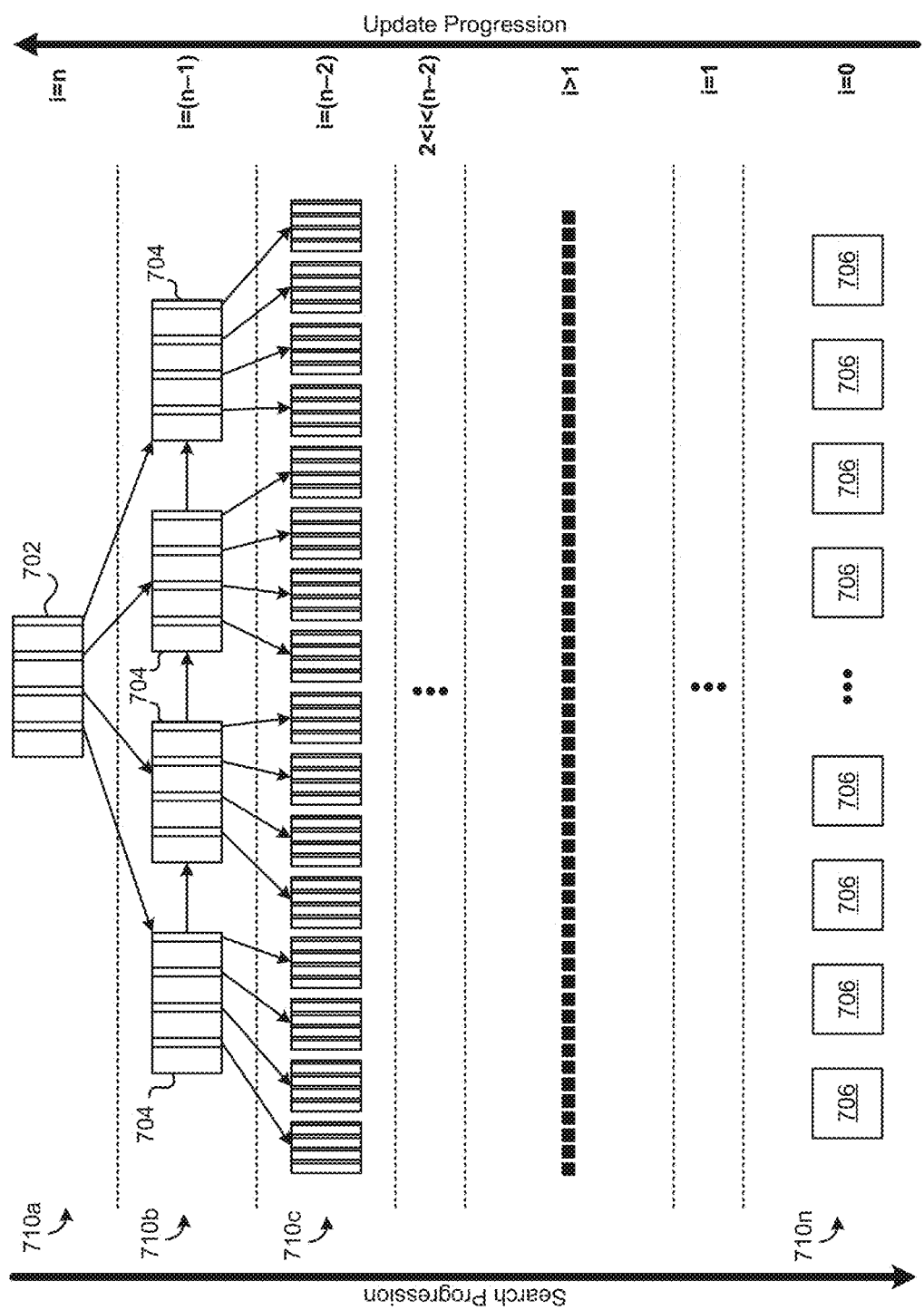
FIG. 7 is a simplified schematic of an n-layer tree-based data structure, and the progression of processing with respect to the tree-based data structure during a search phase and an update phase, according to a preferred embodiment.

For example, one implementation of a the presently disclosed inventive concepts is shown schematically in FIG. 7, where an n-layer tree based data structure includes multiple layers 710a, 710b, 710c . . . 710n. The root layer 710a has a root node 702, from which four internal nodes 704 descend, forming another node layer 710b. Similarly, the nodes 704 of this node layer have descending therefrom four nodes each, forming yet another node layer 710c. The tree expands in this manner until reaching the $n^{th}$ layer 710n which includes a plurality of leaf nodes 706, each storing one or more data entries. Any number of layers may intervene the root layer 710a and the leaf node layer 710n without departing from the scope of the presently disclosed inventive concepts.

In essence, the processing performed according to the present disclosures occurs in two primary phases. The search phase initiates at the root layer 710a and progresses layer-wise toward the leaf nodes 706 in the $n^{th}$ layer 710n.

Conversely, the update phase initiates at the leaf node layer 710n in a first iteration (i=0) and progresses upward through one or more iterations (i≥1), potentially all the way to the root node 702 in an $n^{th}$ iteration (i=n). Of course, in various embodiments the update phase may terminate prior to reaching the root node layer 710a, e.g. in response to determining no nodes are specified in a nodes and operations set generated during the immediately prior update phase iteration, e.g. iterations i=(n−1), i=(n−2), 2<i<(n−2), i>1, etc. as shown in FIG. 7.

In preferred embodiments, during each iteration of the update phase, a layer of the data structure is processed, and the appropriate operations are performed on all appropriate nodes in that layer concurrently and in bulk. The update phase handles nodes that become full or under-filled as a result of applying the heterogeneous operations. The output of each update phase is a set of nodes in the next upper layer of the tree and operations that will be applied on these nodes, where these operations are the result of the operations applied on the nodes in the current layer of the tree. The operations generated during an update phase, to be applied on the nodes of the next upper layer of the tree, support the new form of the nodes that were created, deleted and whose entries contents was updated, in the processing of the current layer of the tree. The output set of nodes and operations of the current update phase is then provided as input for the next update phase, namely for processing of the next upper layer of the tree. Processing of the algorithm completes when the Nodes and Operations set generated by processing of a layer of the tree is empty.

Figure 9:
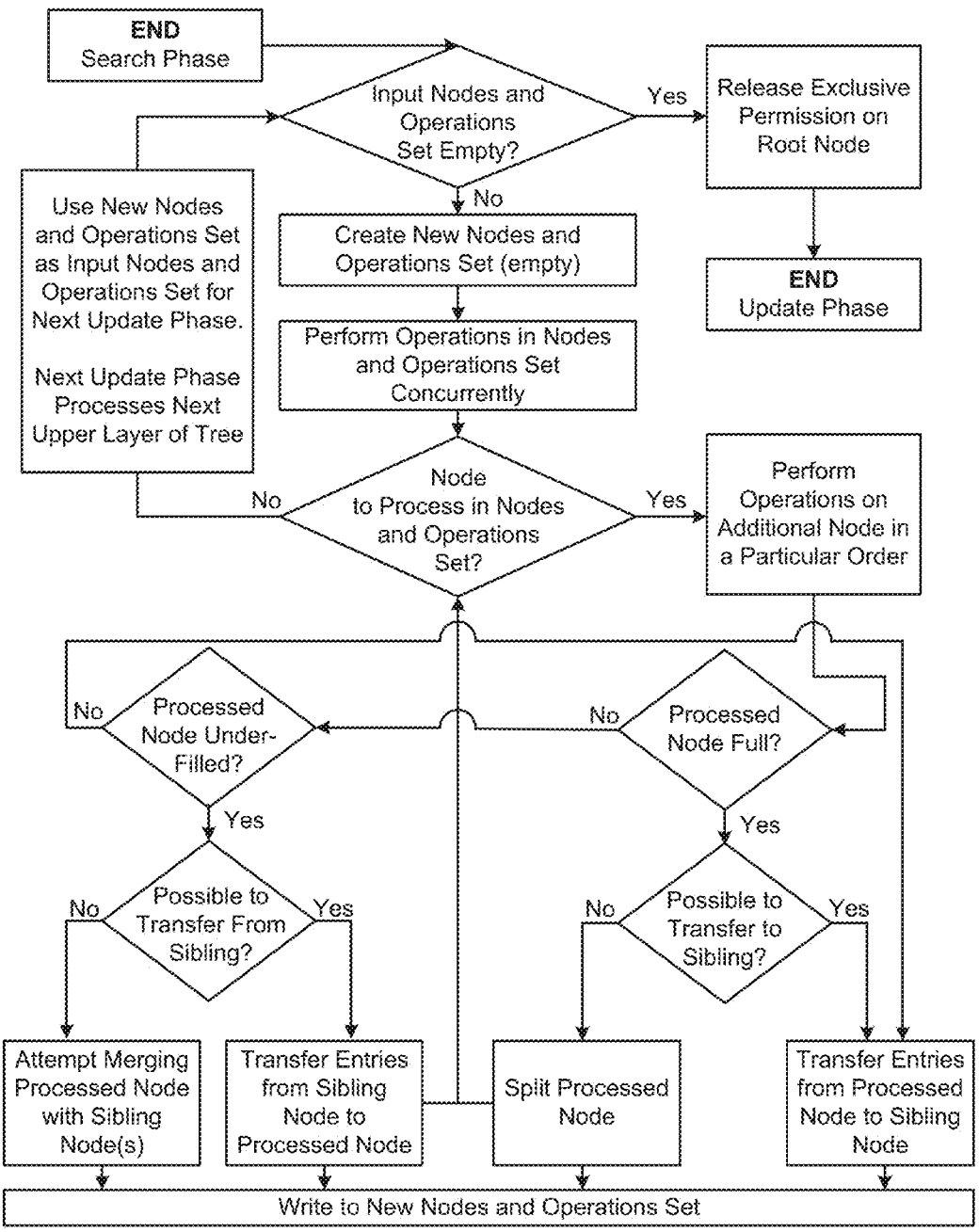
FIG. 9 depicts a flowchart representing processing during a search phase according to a preferred embodiment of the presently disclosed inventive concepts.
Figure 10:
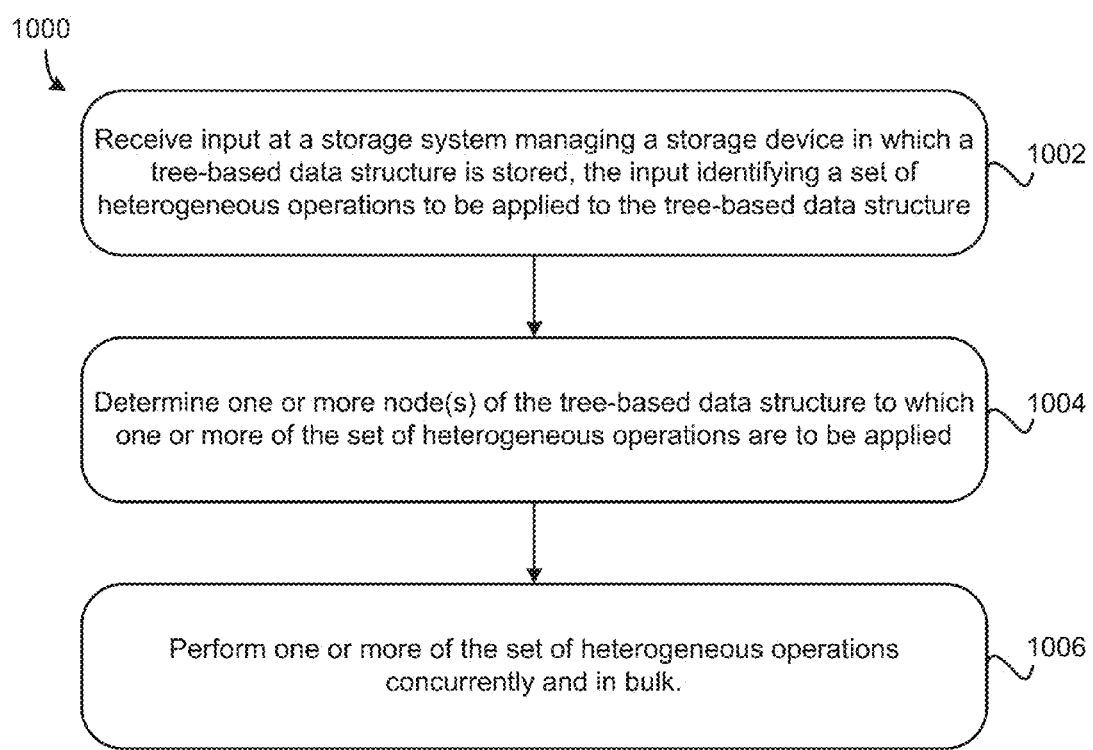
FIG. 10 is a flowchart of a computer implemented method for concurrent bulk processing of heterogeneous operations on a paged search tree data structure, according to one embodiment.

Accordingly, and with reference to FIG. 10, a flowchart of a method 1000 is shown according to one embodiment. The method 1000 may be performed in accordance with the present invention in any of the environments depicted in FIGS. 1-9, among others, in various approaches. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a disk manager of a hierarchical storage system, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

The method 1000 is configured for concurrent processing of operations on a tree-based data structure, such as any of the tree-based structures shown in FIGS. 4-6, among other similar tree-based structures that would be appreciated by a person having ordinary skill in the art upon reading the present descriptions. The root node layer and leaf nodes layer may be separated by any number of intermittent layers. The tree-based structure may comply with the definitions of a B+-tree, a B-tree, or any other suitable type of tree-based structure.

Regardless of the particulars of the tree-based data structure, and as shown in FIG. 10, method 1000 includes operation 1002, where input is received by a storage system in which the tree-based data structure is stored. The input identifies a set of heterogeneous operations to be applied to the tree-based data structure.

Preferably, the input includes a reference to the tree-based data structure, and a list of pairs, where each pair sets forth a data entry and an associated operation. Each data entry may include a key, and a payload in which data are stored.

In various approaches, the set of heterogeneous operations may include any one or more of: insertion operations, deletion operations, and update operations. An insertion into a node may cause the node to overflow and therefore require a split of the node, which in turn may require modifications to be applied to entries in the tree layers above the leaves. A deletion from a node may cause the node to become under-filled thus requiring to possibly merge the node with another node, which in turn may also require modifications to be applied to entries in the tree layers above the leaves. To account for changes in the data structure organization, such modifications may include adding, updating or removing routing entries, and may be propagated up to the root node of the tree. Updating a node preferably comprises updating the entries stored therein. Of course, the aforementioned examples are to be considered nonlimiting, and heterogeneous operations may include any suitable type of operation that would be understood by a skilled artisan upon reading the present descriptions.

In one embodiment, decisions of whether and how to modify the data structure are preferably based on node balancing criteria. Node balancing criteria may be predefined based on desired system storage utilization, performance, etc. For example, node balancing criteria in one embodiment may include a predefined minimum, average, etc. storage utilization for each page (node) of the storage device to which the tree corresponds.

In preferred approaches, predefined node balancing criteria include a minimum capacity threshold of approximately 50% such that a node (page) may be considered "under-filled" when less than 50% of the page capacity is in use. Node balancing criteria may also include a predefined average capacity threshold of approximately 75%.

Of course, node balancing criteria may also be determined rather than predefined, and may be modified on-the-fly based on characteristics of the storage system in which the tree-based data structure and presently disclosed techniques are implemented.

The storage system may be configured to detect occurrence of any one or more of the below exemplary events, or equivalents thereof that will be appreciated by skilled artisans reading the present disclosure, and take commensurate action by determining new optimal node balancing criteria suitable for the changed circumstances.

Additionally and/or alternatively, node balancing criteria may be defined or determined by a user.

The method 1000 also includes operation 1004, in which nodes, and preferably leaf nodes, to which one or more of the set of heterogeneous operations are to be applied are determined. This determination is preferably based at least in part on the input received in operation 1002. More preferably, based on the list of pairs defining data entries and operations associated therewith, operation 1004 includes determining which nodes of the data structure require processing with one or more of the heterogeneous operations.

In particularly advantageous approaches, the determination performed in operation 1004 may be embodied as a search phase. For instance, and with reference to a tree-based data structure e.g. as depicted in FIG. 6, in one embodiment the search phase may include evaluating each layer of the tree-based data structure in a descending order. For each layer, the search phase may include concurrently determining, based in whole or in part on the data entries specified in the list of pairs, whether any of the nodes in the layer being evaluated are a node to which, or to its descendant nodes, one or more of the set of heterogeneous operations should be applied. The determining may exclude accessing the nodes storing data entries (i.e. leaf nodes), and instead be based on routing information stored in internal nodes, in some approaches.

For instance, and according to one exemplary approach, the search phase may include descending the tree concurrently for each input pair, and obtaining a storage identifier of the leaf node in the data structure to which the operation specified by the input pair should be applied. Determining that an operation or set of heterogeneous operations should be applied to a particular leaf node may include comparing data entries stored in the node to a data entry specified by the input pair and associated with one or more operations.

Preferably, the search is performed concurrently for all the input pairs, using shared permissions to access the nodes. The search phase can utilize caching, to further minimize storage accesses and improve the function of the corresponding storage system.

In additional and/or alternative approaches, the search phase can be performed in sub-sets, rather than individually for each input pair. Namely, at the root node, the input pairs may be partitioned into sub-sets according to the nodes in the next lower layer to be accessed, and the access to each of these nodes may be performed by a different thread of operation processing the relevant sub-set, thus continuing the descent. In this manner, the presently disclosed inventive concepts permit parallelization of the search phase across plural operation processing threads, significantly reducing time required to perform the search phase.

Whether performed individually for each input pair, or in sets, in preferred embodiments the leaf nodes of the data structure storing data entries are not directly accessed in the search phase, but only in the update phase.

The output of the search phase is a "nodes and operations set," which generally identifies the nodes determined in the search phase to which one or more of the set of heterogeneous operations should be applied, and preferably includes a list of storage identifiers of the nodes determined in the search phase to which one or more of the set of heterogeneous operations should be applied.

In various embodiments, in the nodes and operations set, each of the storage identifiers of nodes in the list of storage identifiers is associated with a list of pairs of input data entry and operation (i.e. insertion, deletion, update), where this list is to be applied to the node identified by the associated storage identifier.

Figure 8:
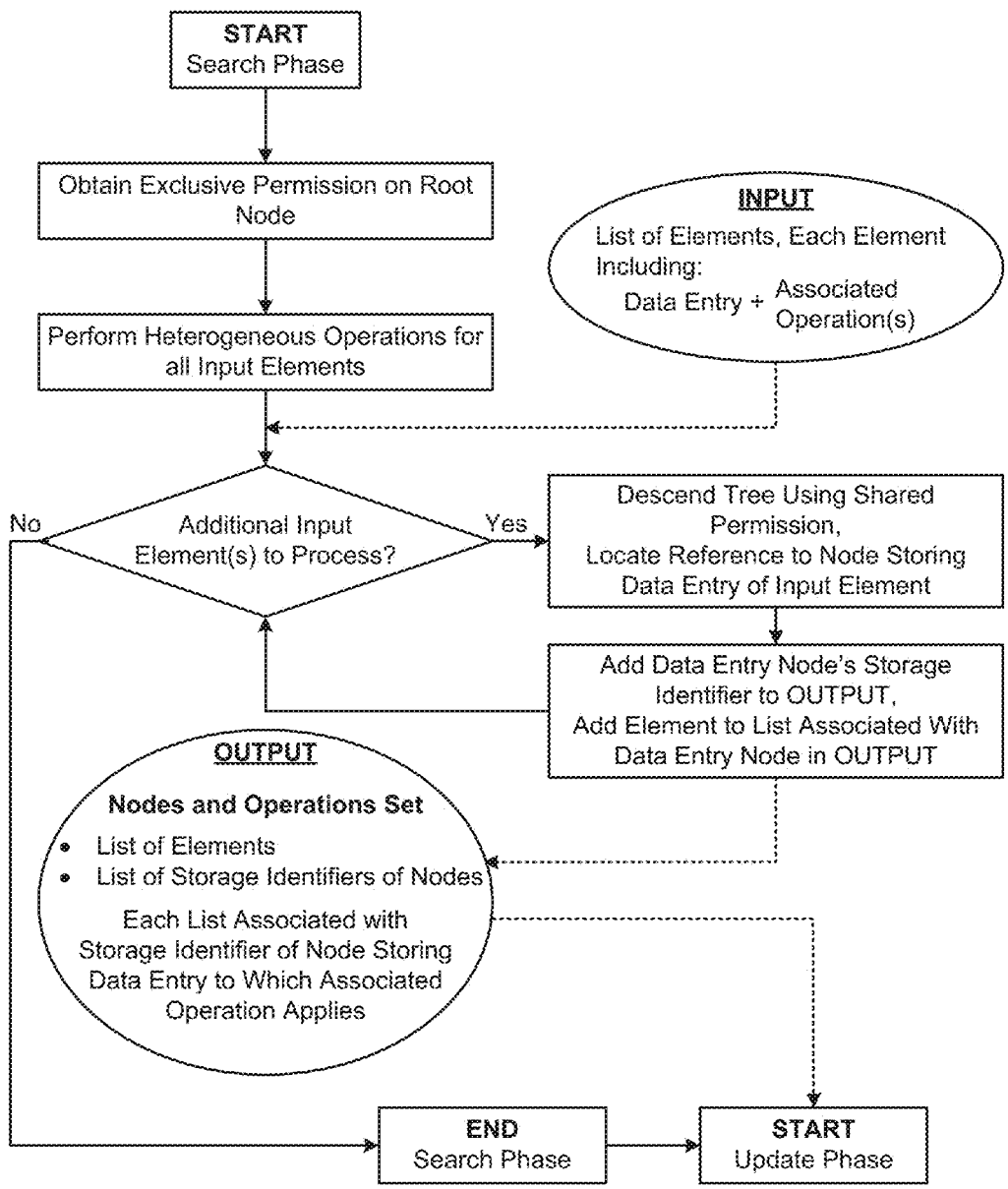
FIG. 8 depicts a flowchart representing processing during a search phase according to a preferred embodiment of the presently disclosed inventive concepts.

In more approaches, the search phase may occur substantially according to a process flow as depicted in FIG. 8.

Thus, in various approaches, operation 1004 of method 1000 may include generating output comprising a nodes and operations set. The nodes and operations set includes a list of storage identifiers, and each storage identifier identifies one of the nodes to which one or more of the set of heterogeneous operations should be applied. Moreover, in some approaches each of the storage identifiers is associated with at least one data entry and operation pair identified in the input received in operation 1002.

Method 1000 further includes, according to one embodiment, operation 1006 where the one or more of the set of heterogeneous operations are performed concurrently and in bulk. The tree data structure is preferably processed in an iterative, layer-wise fashion, with all nodes identified in the nodes and operations set belonging to a particular layer being processed concurrently and in bulk. This processing will be described in further detail below, in the context of the inventive update phase disclosed herein.

In preferred embodiments, applying the set of heterogeneous operations to the various nodes of the tree data structure is accomplished via one or more iterations of an "update phase" including layer-wise concurrent bulk updating of the tree-based data structure. The update phase may initiate, e.g. for a tree-based data structure such as shown in FIGS. 4-6, by applying one or more of the set of heterogeneous operations to one or more nodes in a lowest layer of the tree-based data structure (e.g. the second node layer 410c, 510c as shown in FIGS. 4 and 5, respectively, or the $n^{th}$ layer 610n as shown in FIG. 6), where those leaf nodes have a storage identifier listed in the nodes and operations set.

Accordingly, for each of the nodes in the second node layer (i.e. the layer above the previously processed layer) having a storage identifier listed in the nodes and operations set generated by the processing of the previous layer, the set of heterogeneous operations applied to the node may be based on the data entry/operation pair(s) associated with the storage identifier of that node in the nodes and operations set.

Importantly, in one approach the set of heterogeneous operations are applied concurrently and in bulk to each of the nodes in the second node layer having a storage identifier listed in the nodes and operations set. Preferably, concurrent bulk processing includes isolating each node being processed in the current node layer in a manner that permits evaluation and qualification of neighboring nodes eligible for involvement in node balancing operations required as a result of applying the heterogeneous operations to the nodes in the current layer.

In various embodiments, applying the heterogeneous operation(s) to the node(s) in a particular node layer may involve inserting new nodes in one or more layers of the tree; deleting existing nodes in one or more layers of the tree; merging existing nodes in one or more layers of the tree: splitting one or more existing nodes in one or more layers of the tree; and/or updating one or more data entries of existing nodes in one or more layers of the tree.

When applying the heterogeneous operation(s) on a layer above the leaf nodes layer includes insertion of an entry, the insertion operation is preferably performed in response to determining one or more existing nodes in at least one of the layers below the current layer were split. Furthermore, the insertion operation may require creating one or more nodes in the current layer of the tree-based data structure.

When applying the heterogeneous operation(s) on a layer above the leaf nodes layer includes deletion of an entry, the deletion operation is preferably performed in response to determining one or more existing nodes in at least one layer of the tree-based data structure below the current layer were merged. The deletion operation may also require deleting one or more nodes in the current layer of the tree-based data structure.

The entries and operations generated during the processing of the current layer of the tree support the new form of the nodes that were updated, created and deleted in the processing of the current layer of the tree. Three exemplary cases that generate such entries and operations are set forth immediately below.

First, in one embodiment new nodes that are created when processed nodes are split and generate entries to be added to the next upper layer of the tree.

Second, in another embodiment full transfer of entries (e.g. via merge) from a processed node to sibling nodes, results in the processed nodes being deleted, and generates a deletion operation of an entry referencing that deleted node in the next upper layer of the tree.

Third, in more embodiments a processed node whose entries contents was modified and as a result its representative entry has changed, generates entries to be deleted and inserted to the next upper layer of the tree.

Of course, in various embodiments one or more of the exemplary cases, among others that will be understood by skilled artisans upon reading the present descriptions, may be experienced in a single iteration (or multiple iterations) of processing the tree-based data structure.

In general, the update phase preferably generates output identifying a set of operations that should be applied during a next iteration, which preferably correspond to nodes of a different layer of the tree-based data structure, more preferably a layer above the layer processed during the current iteration of the update phase, and most preferably a layer immediately above the layer processed during the current iteration of the update phase.

In some embodiments, the update phase generates as output a new nodes and operations set based at least in part on applying the set of heterogeneous operations to the node layer processed during the update phase. The new nodes and operations set includes a list of storage identifiers. Each storage identifier in the new nodes and operations set identifies one of the nodes in the next node layer to be updated. The nodes in the next node layer which are identified in the new nodes and operations set are nodes to which one or more of the set of heterogeneous operations should be applied. Preferably each of the storage identifiers in the new nodes and operations set is associated with at least one data entry and operation pair.

The update phase may include any number of iterations, progressively updating the tree-based data structure layer-by-layer in an ascending (bottom-up) manner from the terminal nodes of the tree-based data structure to the root node.

In various embodiments, iterative updating may initiate at a lower-most layer of the tree-based data structure, and progressively update each layer until reaching the layer containing the root node. Alternatively, the update phase may progressively update only a subset of the layers of the tree-based data structure.

In more approaches, the iterative update process may also result in the generation of new layers of the tree structure, e.g. to accommodate node balancing operations and/or criteria. Node balancing operations may require new layers to be generated, e.g. in response to node balancing causing a root node to split, requiring a new root node in a layer above the previous root node. Node balancing criteria such as node utilization thresholds may also require new nodes to be created, e.g. by requiring a root node split, etc.

Accordingly, the nodes and operations set generated by one update phase iteration may serve as the input for the next update phase iteration. Preferably, this new nodes and operations set identifies a set of nodes in a layer above the layer updated in the current iteration, the identified nodes being those to which one or more of a set of heterogeneous operations should be applied in the next update phase iteration.

In more approaches, one or more update phase iterations may also include determining whether the nodes or operations input set is empty, and if so, completing processing of the tree-based data structure, as there are no further modifications that have to be applied to the upper layers of the tree-based data structure. In some embodiments, completion of processing may involve releasing a permission on the root node, if such a permission was previously secured on the root node. In further embodiments, such a permission may be an exclusive permission.

If the nodes and operations input set is not empty, the techniques discussed herein may include creating a new empty nodes and operations set; populating the empty nodes and operations set with the storage identifiers of the nodes to which one or more of a set of heterogeneous operations should be applied in the next update phase iteration; and associating the storage identifiers with an appropriate set of one or more heterogeneous operations to be performed on the corresponding nodes in the next update phase iteration.

In one embodiment, update phase iterations may include applying one or more of the set of heterogeneous operations to each node in a particular node layer having a storage identifier listed in the new nodes and operations set generated during a prior update phase iteration, for a subsequent (i≥1) update phase iteration, or generated during the search phase, for the first update phase iteration (i=0). Preferably, where the nodes in the particular node layer having storage identifiers listed in the new nodes and operations set include leaf nodes, the heterogeneous operation(s) applied to the leaf nodes are based on at least one data entry and operation pair associated with the storage identifier for the leaf node and provided as input to the storage system. Furthermore, the heterogeneous operation(s) are applied concurrently and in bulk to each of the nodes in the particular node layer having a storage identifier listed in the new nodes and operations set.

With reference to FIG. 4, and according to preferred embodiments, this iterative update phase process includes updating node(s) 406 in the first node layer 410c during the first iteration (i=0), generating a new nodes and operations set identifying node(s) 404 in the second node layer 410b to which heterogeneous operation(s) should be applied, and updating the node(s) 404 of the second node layer 410b in the second iteration (i=1) of the update phase.

In particularly preferred embodiments, the nodes 406 in the first node layer 410c are leaf nodes storing data entries, and are part of a B+ tree data structure. The nodes 404 in the second node layer 410b are internal nodes storing routing information.

Of course, additional embodiments within the scope of the present disclosures may include tree-based data structures having nodes of plural layers store data entries and/or routing information, having nodes storing data entries at multiple layers of the tree, etc. e.g. as generally depicted in FIGS. 5 and 6. Especially according to these embodiments, the iterative update phase may include updating data entries for nodes on any layer of the tree-based data structure, updating routing information for nodes on any layer of the tree-based data structure, modifying relationships between nodes on any layer of the tree-based data structure, transferring information between nodes on any layer of the tree-based data structure, etc. as would be understood by a person having ordinary skill in the art upon reading the present descriptions.

Regardless of the particular tree structure, according to various embodiments the update phase may include determining whether the original and/or new nodes and operations set lists any storage identifiers corresponding to a node in a next upper layer of the tree. In response to determining the nodes and operations set does not include any storage identifiers corresponding to a node in the next upper layer of the tree, it is preferable to terminate the update phase.

In particularly preferred approaches, nodes are accessed using shared permission in the search phase, and nodes are accessed using exclusive permission in the update phase.

The application of heterogeneous operations to nodes in a particular layer occurs concurrently and in bulk, which involves applying operations to each node using a different process thread. More preferably, each process thread runs in parallel to reduce computation time and improve the storage system implementing the presently disclosed techniques by speeding up the process of locating and updating data in a tree-based data structure, all while requiring less computational cost.

For instance, by processing heterogeneous operations in bulk, and accommodating any necessary node balancing or other manipulations of tree structure in a single, iterative process, the presently disclosed techniques avoid the need to apply a particular type of operation across the tree, then perform another search to locate data entries for a different type of operation to determine if any of the data entries targeted by the different type of operation are in a different location than before the particular type of operation was applied across the tree.

Processing nodes during the update phase, according to various embodiments may be performed in any suitable manner that permits concurrent, bulk processing of heterogeneous operations across plural nodes in a particular layer of the tree-based data structure. In a particularly preferred embodiment, processing during the update phase occurs substantially as represented in FIG. 9.

In preferred embodiments, the operations associated with the node in the input nodes and operations set are performed in a particular order that confers additional efficiency on the presently disclosed inventive concepts and further improves the functioning of the storage system itself. The order of operations will be discussed in further detail below.

During an initial update phase iteration, which may process a layer including leaf nodes, may process operations associated with a node in the input nodes and operation set generated by the search phase according to either a user-provided order of operations, or according to the preferred order specified herein. The preferred order specified herein advantageously minimizes the structural changes resulting from applying operations on a given node, therefore contributing to the efficiency of the algorithm and further improving the function of the storage system in which the algorithm is implemented. Regardless of the particular order implemented, the update phase may initiate by obtaining exclusive access over the root node.

The preferred order includes performing update operations, followed by deletion operations, and subsequently insertion operations.

More specifically, the first operation to be performed is preferably to update the payload of data entries in the node. The second operation is to delete entries from the node. At this point, no further node-balancing or merging operations need be performed until processing of all input operations is complete. Indeed, preferably no balancing or merging operations are performed unless the node being processed becomes under-filled as a result of applying all the input operations. The third operation is to insert entries into the node. In the case of insertion, a node may become full before all the input operations are applied, and thus in these situations node re-balancing or splitting may be required to be applied during the insertions if the node becomes full.

In various embodiments, a node becoming full may be determined by comparing a node utilization level (i.e. an amount of data stored in the node) to a maximum capacity of the node.

Similarly, a node becoming under-filled may be determined by comparing the node utilization level to a minimum node utilization threshold. The minimum node utilization threshold may be predetermined according to user preference, or particular needs of the storage system, e.g. storage utilization and/or performance requirements. In preferred approaches, the minimum node utilization threshold is approximately 50% of total node capacity. Of course, other values less than 100%, e.g. 25%, 30%, 35%, etc. may be employed without departing from the scope of the present disclosures.

To address situations where a node becomes full, node re-balancing may be employed. Preferably, this node re-balancing involves determining whether the full node has any adjacent nodes, preferably adjacent nodes that were not identified in the nodes and operations set provided as input to the current iteration. In response to determining such an adjacent node exists, node re-balancing includes determining whether transferring entries from the full node will cause the adjacent node to become full itself. In response to determining the adjacent node will not become full, node re-balancing includes determining whether the further insertions pending in the input nodes and operations set will not have to be applied on the adjacent node due to the transfer of entries (all insertions must be applied to the nodes identified in the input nodes and operations set rather than to adjacent nodes). In response to determining that the further insertions will not have to be applied on the adjacent node, node re-balancing includes determining whether the adjacent node will not become full due to the transfer of entries. In response to determining that the adjacent node will not become full due to the transfer of entries, node re-balancing includes determining whether the transfer of entries to the adjacent node will cause the full node to have a node utilization level within a specified node utilization range (e.g. above the minimum node utilization thresholds). In response to determining the transfer will accomplish this result, the entries are preferably transferred. More preferably, several entries may be transferred in order to create capacity for the additional pending insertions in the node being processed.

More preferably, the nodes to which the entries are transferred are locked (e.g. via exclusive access) only for the duration of the transfer. Most preferably, this node re-balancing is performed only after all insertions are applied to nodes in the layer being processed, and no insertions were applied to the adjacent nodes receiving the transferred entries.

In more embodiments, node re-balancing to relieve a full node may include splitting the node, e.g. if the above transfer procedure is not possible because any of the determinations listed above are resolved in the negative.

Notably, in some circumstances applying a set of heterogeneous operations to nodes of a particular layer of the tree-based data structure may result in several occurrences where a node being processed becomes full over the course of that update phase iteration, and thus it may be desirable to perform node re-balancing multiple times per update phase iteration.

Nodes that become under-filled during an update phase iteration may be re-balanced in an analogous manner, according to several embodiments. For instance, in one embodiment node re-balancing to relieve the problem of under-filled nodes involves determining whether the under-filled node has any adjacent nodes that were not identified in the nodes and operations set provided as input to the current iteration.

In more embodiments, and in response to determining such an adjacent node exists, node re-balancing includes determining whether transferring entries from the adjacent node will cause the adjacent node to become under-filled itself.

In still more embodiments, and in response to determining the adjacent node will not become under-filled, node re-balancing includes determining whether the transfer of entries to the under-filled node will cause the under-filled node to have a node utilization level within a specified node utilization range (e.g. above the minimum node utilization thresholds). In response to determining the transfer will accomplish this result, entries are preferably transferred.

More preferably, in some approaches the nodes from which the entries are transferred are locked (e.g. via exclusive access) only for the duration of the transfer. Most preferably, this node re-balancing involves transferring only a number of entries or an amount of information required to bring the under-filled node within the desired node utilization range.

In more embodiments, node re-balancing to relieve an under-filled node may include merging the under-filled node, e.g. if the above transfer procedure is not possible because one or more of the determinations set forth above are resolved in the negative. In these circumstances, merging may include a series of determinations. For instance, in one approach merging nodes involves determining whether the under-filled node has an adjacent node which is not included in the input nodes and operations set. In response to determining that there is such an adjacent node, merging an under-filled node further includes determining whether the adjacent node will become full due to transferring of all the entries from the under-filled node to the adjacent node. In response to determining that the adjacent node will not become full due to transferring of all the entries from the under-filled node to the adjacent node, merging an under-filled node further includes transferring all entries from the under-filled node to the adjacent node. After transferring all the entries from the previously under-filled, now empty node, this node may be deleted. Entries may be transferred from the under-filled node to more than one adjacent node, to enable emptying the under-filled node.

Advantageously, the directionality of the transfer in the merge operation discussed immediately above, i.e. transfer entries from under-filled node to adjacent node rather than from adjacent node to under-filled node, serves to prevent a need to delete adjacent nodes which are involved in merge operations. This is beneficial because other concurrent operations may require access to these adjacent nodes concurrently, and in some approaches this access must be possible because such nodes are still referenced from another upper tree layer. In addition, the directionality desirably results in a situation where the deleted node is not required for other concurrent operations, retaining consistency with the other concurrent operations.

In preferred embodiments, when processing of the current node is complete, an exclusive permission on the node, if previously acquired, is released. In addition, during processing of a particular tree layer, access to the other, e.g. upper, tree layers, for the purpose of locating adjacent nodes, is performed concurrently by all concurrent operations, e.g. using shared permissions.

As mentioned above, the output of the concurrent processing of operations on the nodes of the current layer is a new nodes and operations set, comprising of a list of storage identifiers of the nodes in the next layer of the tree to which operations should be applied. In some embodiments, the new nodes and operations set may consist of the list of storage identifiers and a set of one or more heterogeneous operations associated with each storage identifier.

Preferably, the operations defined in the new nodes and operations set, which should be applied to the next layer of the tree, are the result of the operations applied to the nodes in the current layer. In such embodiments, the new nodes and operations set includes lists of pairs, each pair including an entry, e.g. data or routing entry, and an associated operations (e.g., insertion, deletion, update, etc.) to be applied thereto. Each such list of pairs may advantageously be associated with a storage identifier of a node to which the operations in the list should be applied.

Again, the entries and operations generated during the processing of the current layer of the tree advantageously support the new form of the nodes that were updated, created and deleted in the course of processing the current layer of the tree.

In various embodiments, situations likely to generate entries and operations that support the new form of the nodes include new nodes being created when processed nodes are split. This generates entries to be added to the next upper layer of the tree. Such entries are included in the nodes and operations set being generated during processing of a current tree layer.

In more embodiments, situations likely to generate entries and operations that support the new form of the nodes include transfers of entries, especially full transfer of entries (e.g. via merge operations), from a processed node to adjacent nodes. In particular, where such a transfer results in the processed node being deleted, it may be advantageous to require deletion of an entry referencing that deleted node in the next layer of the tree, since the reference to the deleted node is now invalid.

In still more embodiments, situations likely to generate entries and operations that support the new form of the nodes include update operations which involve modifying entries in a manner that causes a node's representative entry to change. In this circumstance, it is advantageous to generate entries for deletion from and/or insertion into, the next upper layer of the tree. As will be understood by those having ordinary skill in the art upon reading the present descriptions, such deletion and insertion may help maintain consistency within the tree structure and routing entries by ensuring representative entries correctly identify data and/or routing information according to the modified tree structure.

In preferred embodiments, the set of heterogeneous operations specified in the received input are performed for the particular layer, any nodebalancing operations are performed for the particular layer; and upon completion of these operations, the new nodes and operations set is generated and output for use in a subsequent iteration of the update phase.

When no operations are necessary for the next layer of the tree-based data structure, the new nodes and operations set will be empty. Accordingly, each iteration of the update phase may include determining whether the nodes and operations set is empty, and in response to so determining, terminating the update phase. Termination of the update phase may include and/or be followed by releasing exclusive access over the root node of the tree-based data structure.

Concurrent, Bulk Processing of an n-Layer B+-Tree

In a more specific circumstance involving an n-layer B+-tree, the techniques described herein may be similarly leveraged to significantly improve performance of a data storage system in which the n-layer B+-tree is implemented as a data structure. The computer-implemented method is designed to facilitate concurrent processing of heterogeneous operations on a paged search tree data structure.

The method preferably includes receiving input at a storage system in which the tree-based data structure is stored: and performing a plurality of heterogeneous operations concurrently and in bulk to one or more of the leaf nodes based on the input. The input identifies a set of heterogeneous operations to be applied to the paged search tree data structure.

As with method 1000, in various embodiments the more specific implementation may involve a search phase. The search phase preferably includes: evaluating each layer of the tree-based data structure in an order from the root node layer to the leaf node layer; and concurrently determining the leaf nodes to which the set of heterogeneous operations should be applied.

In addition, the search phase generates output in the form of a nodes and operations set, which includes a list of storage identifiers. Each storage identifier preferably identifies one of the leaf nodes to which one or more of the set of heterogeneous operations should be applied; and each of the storage identifiers is associated with at least one data entry and operation pair identified in the received input.

Again in a similar manner as for method 1000, the method may include an update phase, which entails applying one or more of the set of heterogeneous operations to each leaf node in the leaf node layer (e.g. leaf node layer 410c as shown in FIG. 4) having a storage identifier listed in the nodes and operations set. More specifically, in this first iteration (i.e. i=−0), for each of the leaf nodes having a storage identifier listed in the nodes and operations set, the set of heterogeneous operations that are applied to the particular leaf node is preferably based on the data entry and operation pair(s) associated with the storage identifier for that leaf node. Furthermore, in preferred approaches the set of heterogeneous operations are applied concurrently and in bulk to each of the leaf nodes having a storage identifier listed in the nodes and operations set.

The update phase may generate a new nodes and operations set for each iteration completed. The new nodes and operations set identifies nodes in a higher layer than the layer processed in the current iteration, and operations to be performed on those nodes. Preferably, this definition is based on the outcome of operations applied to the current layer. Producing this output at each iteration involves generating a new nodes and operations set based at least in part on applying the heterogeneous operations to the nodes having a storage identifier listed in the nodes and operations set.

In one embodiment, the new nodes and operations set generated during the first iteration therefore preferably comprises a list of storage identifiers, and each storage identifier identifies one of the internal nodes in the next upper node layer of the B+-tree to which one or more of the set of heterogeneous operations should be applied. Accordingly, in the next update phase iteration (i=1), the set of heterogeneous operations are applied to the internal nodes in the next upper node layer having a storage identifier listed in the new nodes and operations set. Preferably, the set of heterogeneous operations are applied concurrently and in bulk to each of the internal nodes in the second node layer having a storage identifier listed in the nodes and operations set.

The iterative process described above may continue, propagating any necessary modifications to the entries in the B+-tree and/or modifications to the B+-tree structure in a layer-wise fashion until no further operations are needed, the nodes and operations set is determined to be empty, and thus the update phase terminates. Preferably, the set of heterogeneous operations are applied concurrently and in bulk to each of the nodes in a particular layer having a storage identifier listed in the nodes and operations set generated during the prior update phase iteration.

Isolating Concurrent Operations During Tree Manipulation

The presently disclosed inventive concepts confer improvements to the functioning of conventional storage systems that utilize tree-based data structures by reducing computational cost of updating data entries and tree structure. As noted above, a significant aspect of this improved efficiency derives from the inventive techniques for concurrent bulk processing of heterogeneous operations in the context of tree-based data structures.

An additional aspect of the presently disclosed inventive techniques confers further computational efficiency by isolating the processing of nodes being processed in a particular layer of the tree-based data structure to facilitate these heterogeneous operations being processed concurrently and in bulk. This isolation technique, in various embodiments, generally involves qualifying those nodes that can receive entries from and/or give entries to nodes being processed in a current update phase iteration.

Practically, this enables the update process to efficiently handle full and under-filled nodes, and by doing so facilitates the processing of each node in an independent and isolated manner. Especially when coupled with parallelization of the various operation process threads, this isolation improves the efficiency contributed by concurrently processing the nodes of a given tree layer.

In general, the presently disclosed inventive isolation procedure isolates the processing of nodes specified for processing in the input nodes and operations set for a specific layer, by qualifying nodes to be considered for involvement in node re-balancing and other structural modification operations, particularly transfer of entries.

For instance, in accordance with one aspect, the nodes which may qualify are nodes upon which none of the operations being performed have any dependency, such that the nodes may be involved in transfer operations, merge operations, etc. without interfering with the other operations comprising the overall tree modification/update process. In practice, these qualifying nodes include nodes that (1) are adjacent to nodes being processed, (2) are not themselves included in the input set of nodes to be processed, and (3) satisfy one or more additional qualification criteria that depend on the particular case. These additional qualification criteria are described in further detail below.

In one embodiment where entries may be transferred from a processed node to a qualifying node, additional qualification criteria include whether the proposed transfer would cause the adjacent node to become full. If so, then the node may not qualify for the transfer, but otherwise the node may qualify for the transfer.

Conversely, in one embodiment a node may qualify for involvement in a transfer of entries from the node to an adjacent node subject to processing when the node from which entries are to be transferred will not itself become under-filled resultant to the transfer. Accordingly, additional qualification criteria may generally involve the desired utilization range for nodes, and the qualification process may preferably include evaluating node utilization levels against the desired utilization range, determining whether the proposed transfer will result in a violation of the desired utilization range, and qualifying nodes in response to determining the proposed transfer will not result in such a violation.

In more embodiments, additional qualification criteria in this scenario may include whether the transfer will require further pending insertion operations to be applied to the adjacent node to which the transfer is proposed. Again, if so, then the node may not qualify, but otherwise may qualify.

In yet another scenario, additional qualification criteria may include the directionality of a proposed merge operation.

More specifically, qualification may include determining whether a proposed merge of a processed node with adjacent nodes involves transferring all the entries of the processed node into the adjacent nodes, or vise-versa. In response to determining the proposed merge involves transferring all the entries of the processed node into the adjacent nodes, the adjacent nodes may qualify for the transfer of entries. Otherwise, the adjacent nodes may not qualify.

Furthermore, the unidirectional nature of the permitted merge means the processed node rather than the adjacent nodes are subject to deletion after the merge operation. Preferably, the adjacent nodes are not deleted by the merge operation.

Regardless of the particular scenario and qualification criteria, in preferred approaches the adjacent nodes are locked via exclusive permission, to enable the transfer(s) be performed concurrently with other operations. However, to minimize delay associated with such exclusive access, the adjacent nodes are preferably locked temporarily, and even more preferably only for the duration of the transfer operation. Upon completion of the transfer, exclusive access over the node is released and other concurrent processing may continue in an efficient manner. Similarly, nodes processed by a modification operation are preferably locked via exclusive access only temporarily, and more preferably only for the duration of the specific modification operation.

As will be understood by those having ordinary skill in the art upon reading the present descriptions, there are certainly possible scenarios in which a particular node being processed by one or more heterogeneous operations may not have a qualifying adjacent node suitable to accommodate a transfer as described herein. In such circumstances, when the processing results in the processed node becoming full, and in response to determining that there are no adjacent nodes that qualify for transferring entries from the processed node, then the processed node is preferably split. Notably, there can be several such split operations that occur, particularly during the processing of insertion operations on a processed node.

Notably, the presently disclosed inventive embodiments, according to various approaches, achieve excellent concurrency via horizontal concurrent processing without a need for added indirect address mapping. Added indirect address mapping undesirably introduces additional overhead and additional resource consumption (e.g. additional I/O operations, processing time, storage, etc.), avoidance of which improves the functioning of the storage system.

Figure 11:
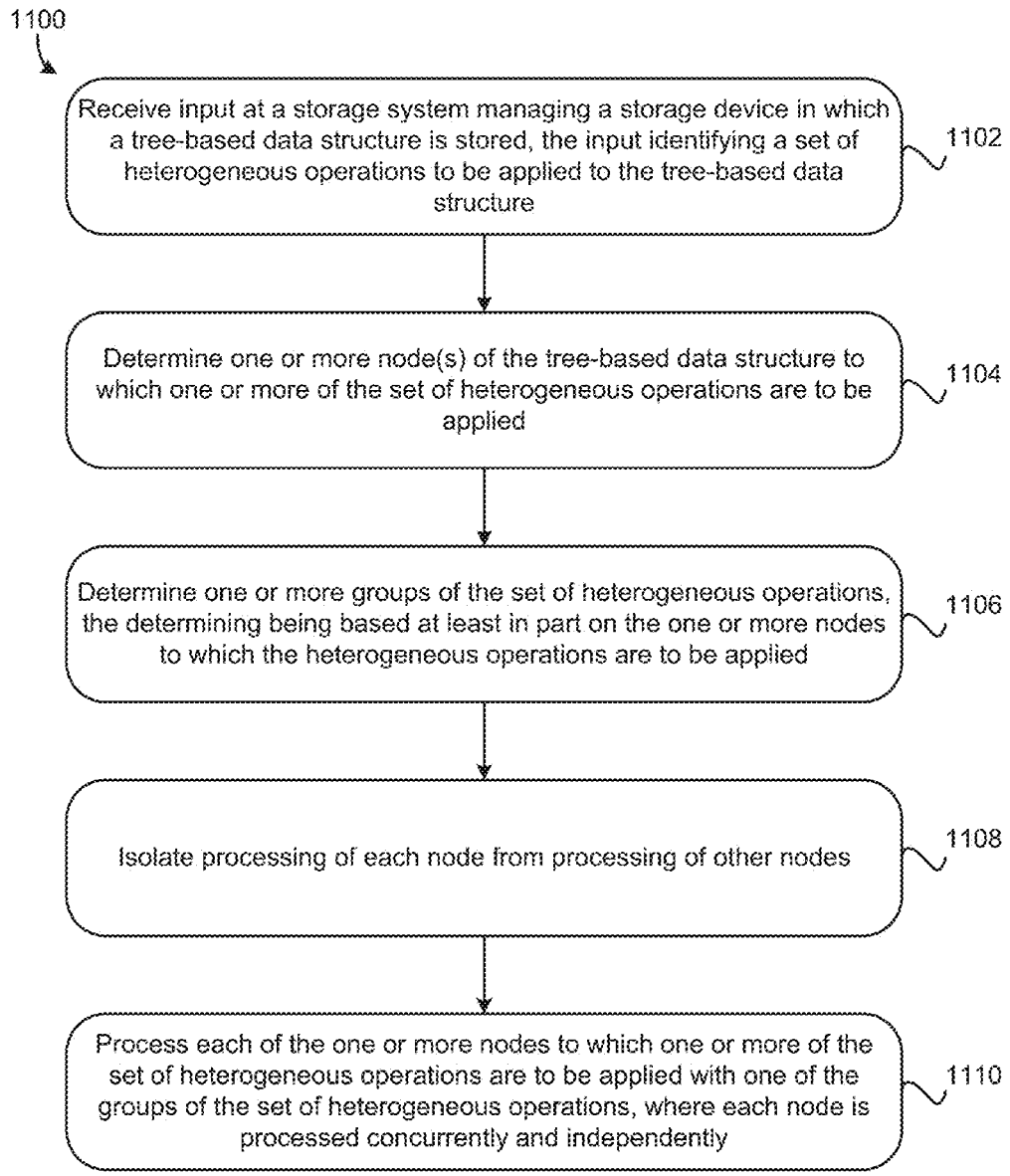
FIG. 11 is a flowchart of a computer implemented method for isolation of concurrent operations on a paged search tree data structure, according to one embodiment.

Now referring to FIG. 11, a flowchart of a method 1100 for isolating nodes to facilitate concurrent bulk processing thereof is shown according to one embodiment. The method 1100 may be performed in accordance with the present invention in any of the environments depicted in FIGS. 1-6, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a storage system manager, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 may initiate with operation 1102, where input is received at a storage system managing a storage device in which the tree-based data structure is stored. The input identifies a set of heterogeneous operations to be applied to the tree-based data structure.

Method 1100 also includes operation 1104, where one or more nodes of the tree-based data structure to which one or more of the set of heterogeneous operations are to be applied are identified or otherwise determined. The determination may be accomplished in any suitable manner consistent with the present descriptions, in various embodiments. In preferred approaches, the determination is based on searching the input entries in the tree-based data structure to determine their accommodating nodes, or on the nodes and operations output generated by the search phase or by a previous update phase iteration, as discussed above.

Further still, method 1100 includes operation 1106, in which one or more groups of the set of heterogeneous operations that are to be applied to the one or more nodes are identified or otherwise determined. The determination may be accomplished in any suitable manner consistent with the present descriptions, in various embodiments. Preferably, the determination is accomplished based on which nodes the one or more operations are to be applied, which may be accomplished based on data included in the nodes and operations set, in various approaches.

In preferred approaches, the determination is based at least in part on the nodes and operations output from the search phase or the previous update phase iteration, as discussed above. In particular, the determination may include grouping heterogeneous operations according to the nodes to which the heterogeneous operations should be applied, as would be understood by a person having ordinary skill in the art upon reading the present descriptions.

In more preferred approaches, each node in the set of nodes and operations occupies a same layer of the tree-based data structure.

In operation 1108, method 1100 includes isolating the processing of each node in the set of nodes and operations for independent processing. As understood herein, node processing isolation includes any suitable technique or mechanism configured to enable the node to be processed using one or more heterogeneous operations, where the processing occurs independently of processing heterogeneous operations on other nodes in the set of nodes and operations. Preferably, node isolation includes isolating each node in the set of nodes and operations such that the entire set of heterogeneous operations to be applied to the node(s) in the set may be carried out without interfering with processing heterogeneous operations on other nodes in the tree, particularly the current layer. For instance, in one embodiment independent processing of isolated nodes includes processing each node on a different process thread.

Method 1100 therefore also includes operation 1110, in which each node in the set of nodes and operations is processed using the one or more groups of the set of heterogeneous operations determined to be applied to the set of nodes. Each node in the set of nodes is preferably processed concurrently and independently.

Preferably, all nodes are processed concurrently such that each process thread is carried out substantially simultaneously. Of course, some threads may take longer to complete than others, but as will be understood by one having ordinary skill in the art upon reading the present descriptions, concurrent, independent processing involves embodiments where processing of all threads in the set is initiated at substantially the same time, and all threads are processed during a substantially identical time window.

As will be understood by those having ordinary skill in the art upon reading the present descriptions, the method 1100 set forth above contemplates the independent, isolated and concurrent processing of a set of nodes using a group of one or more heterogeneous operations determined to be applied to node(s) in the set. Of course, method 1100 may include processing a plurality of different groups of heterogeneous operations to a plurality of different sets of nodes in a similar manner as set forth above.

For instance, in one exemplary embodiment the method 1100 may include processing a plurality of different groups of operations to different sets of nodes, where all nodes in the various sets occupy a single layer of the tree-based data structure. For sake of simplicity, assume the exemplary tree-based data structure has a layer comprising four nodes N1, N2, N3 and N4 (e.g. as shown in FIGS. 4-6).

In such an exemplary scenario, the method 1100 may include determining a group of heterogeneous operations including an update operation and an insertion operation should be applied to a set of nodes including N1, N2 and N3, as well as determining a different group of heterogeneous operations including an update operation and a deletion operation should be applied to a set of nodes including N3 and N4. As will be understood by skilled artisans upon reading the present descriptions, any number of such groups and sets may be determined, and the corresponding nodes isolated for concurrent, independent processing as discussed herein.

Of course, method 1100 may include any number of additional and/or alternative features, such as those discussed above, as well as the illustrative features set forth below.

In one embodiment, method 1100 may include determining whether one or more nodes qualify for involvement in a node re-balancing operation. Preferably, this determination is based on node re-balancing criteria, and may specifically include any combination, permutation, or synthesis of the following considerations.

In one approach, determining whether one or more nodes qualify for involvement in the node re-balancing operation includes: identifying one or more nodes adjacent to at least one node in the set of nodes; determining whether any of the one or more adjacent nodes are excluded from the set of nodes; and qualifying at least one of the one or more adjacent nodes in response to determining the at least one of the one or more adjacent nodes is excluded from the set of nodes. Preferably, the adjacent nodes are not the target of any operations specified in the input received by the storage system.

In preferred embodiments, the node re-balancing operation includes at least a transfer of entries between a node in the set of nodes and a node excluded from the set of nodes. Of course, the method 1100 may similarly include node re-balancing operations such as update operations, split operations, merge operations, etc. as would be understood by a person having ordinary skill in the art upon reading the present descriptions.

In embodiments where the transfer of entries includes transferring entries from the node in the set of nodes to the node excluded from the set of nodes, determining whether one or more nodes qualify for involvement in a node re-balancing operation may include one or more of the following constituent operations. In one approach, determining whether nodes qualify includes determining whether the node excluded from the set of nodes will become full as a result of the transfer of entries; and qualifying the node excluded from the set of nodes for the transfer in response to determining the node excluded from the set of nodes will not become full as a result of the transfer of entries.

Moreover, determining whether the node excluded from the set of nodes will become full as a result of the transfer of entries may include: estimating a utilization level of the node excluded from the set of nodes after the transfer, and comparing the estimated utilization level of the node excluded from the set of nodes to a maximum utilization threshold or to the node's storage capacity. Where the estimated utilization level does not exceed the maximum utilization threshold or the node's storage capacity, the node may be qualified. Where the estimated utilization level does exceed the maximum utilization threshold or the node's storage capacity, the node is preferably not qualified.

In a similar manner, and for embodiments where the transfer of entries includes transferring entries from the node excluded from the set of nodes to the node in the set of nodes, determining whether one or more nodes qualify for involvement in a node re-balancing operation may include the following. In one embodiment, the process involves determining whether the node excluded from the common set of nodes will become under-filled as a result of the transfer of entries; and qualifying the node excluded from the set of nodes for the transfer in response to determining the node excluded from the set of nodes will not become under-filled as a result of the transfer of entries.

Accordingly, determining whether the node excluded from the set of nodes will become under-filled as a result of the transfer of entries may include: estimating a utilization level of the node excluded from the set of nodes after the transfer; and comparing the estimated utilization level of the node excluded from the set of nodes to a minimum utilization threshold. Where the estimated utilization level meets or exceeds the minimum utilization threshold, the node may be qualified. Where the estimated utilization level does not meet or exceed the minimum utilization threshold, the node is preferably not qualified.

In still more embodiments, the node re-balancing operation may include a merge operation. Accordingly, the method may include transferring all entries in the node in the set of nodes to the node excluded from the set of nodes. Determining whether one or more nodes qualify for involvement in a node re-balancing operation involving merge operations preferably includes: determining whether the node excluded from the set of nodes will become full as a result of the transfer of entries; and qualifying the node excluded from the set of nodes for the transfer in response to determining the node excluded from the set of nodes will not become full as a result of the transfer of entries. To complete the merge operation, after transferring all entries to the node excluded from the set, the node in the set of nodes from which the entries were transferred and which became empty is deleted.

As alluded to above, node re-balancing may include obtaining exclusive access to a node qualifying for involvement in the node re-balancing operation, in various embodiments. Preferably, exclusive access is obtained prior to initiating the update of the nodes involved in the node re-balancing operation; and more preferably immediately prior to initiating the update of the nodes involved in the node re-balancing operation. Exemplary embodiments of this process may include performing the node re-balancing operation using the node qualifying for involvement in the node re-balancing operation; and releasing the exclusive access over the node qualifying for involvement in the node re-balancing operation upon completing the node re-balancing operation. Accordingly, the exclusive access preferably exists for an amount of time substantially equating to a duration of the node re-balancing operation.

In even more embodiments, the node re-balancing operation may include a transfer of entries from the node in the set of nodes, for example pursuant to a split operation. Determining whether one or more nodes qualify for involvement in a node re-balancing operation may thus include: identifying one or more nodes adjacent to at least one node in the set of nodes; determining whether any of the one or more adjacent nodes are excluded from the set of nodes; determining whether the adjacent node excluded from the set of nodes will become full as a result of the transfer of entries; and splitting the node in the set of nodes in response to determining the adjacent node excluded from the set of nodes will become full as the result of the transfer of entries.

Of course, the foregoing are merely exemplary embodiments of an inventive technique for isolating nodes for concurrent bulk processing, and should not be considered limiting on the scope of the present disclosures.

Efficient Ordering of Operations

As referenced above, the presently disclosed inventive concepts also confer improved function on conventional storage system architectures via providing a novel and efficient ordering of the heterogeneous types of operations to be applied to a node: The heterogeneous operations are grouped according to the nodes they affect and then ordered inside each group according to their types, in a specific order that minimizes structural changes resulting from applying operations. An advantageous result is to significantly reduce the size of the output operations set generated by each phase of the algorithm, thus reducing the total number of operations needed to complete processing of the tree-based data structure and contributing to the improved computational efficiency conferred by the present techniques.

For instance, in one embodiment a particular group of nodes are affected by an update operation in which entries of each node in the particular group are to be modified. The nodes are grouped for processing, and within the group any structural changes required by virtue of performing the update operations (e.g. insertions, deletions, etc.) are evaluated.

Upon determining the necessary set of operations to accomplish the update and any desirable node balancing, the set of operations are preferably performed according to the preferred order set forth herein. Again, the preferred order includes performing update operations, followed by deletion operations, and subsequently insertion operations. However, in other embodiments a user-defined order may be mandated (e.g. in the received input) and implemented.

Figure 12:
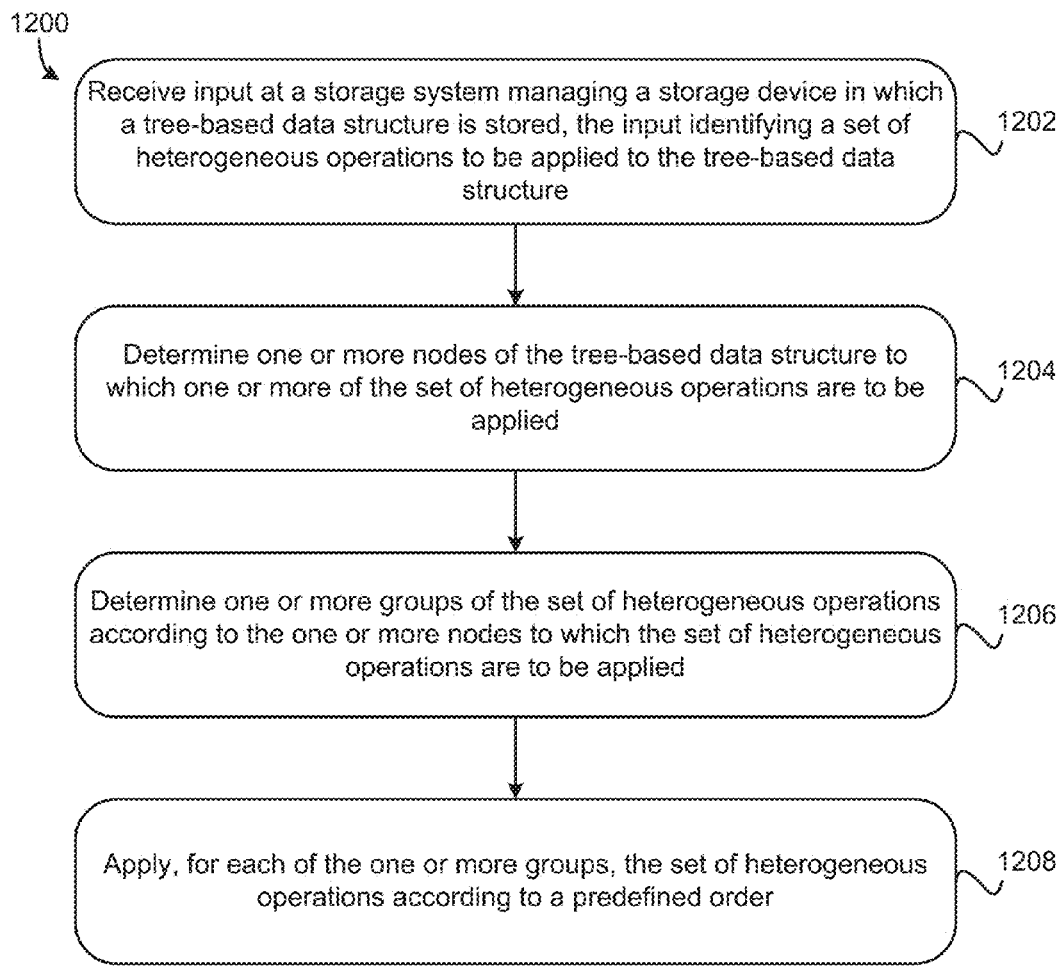
FIG. 12 is a flowchart of a method for efficient ordering of operations on a paged search tree data structure, according to one embodiment.

Accordingly, and as shown in FIG. 12, method 1200 may initiate with operation 1202, where input is received at a storage system managing a storage device in which the tree-based data structure is stored. The input identifies a set of heterogeneous operations to be applied to the tree-based data structure.

Method 1200 also includes operation 1204, where one or more nodes of the tree-based data structure to which one or more of the set of heterogeneous operations are to be applied are identified or otherwise determined. The determination may be accomplished in any suitable manner consistent with the present descriptions, in various embodiments. In preferred approaches, the determination is based on searching the input entries in the tree-based data structure to determine their accommodating nodes, or on the nodes and operations output generated by the search phase or by a previous update phase iteration, as discussed above.

Further still, method 1200 includes operation 1206, in which one or more groups of the set of heterogeneous operations that are to be applied to one or more nodes are identified or otherwise determined. The determination may be accomplished in any suitable manner consistent with the present descriptions, in various embodiments.

In preferred approaches, the determination is based at least in part on the nodes and operations output from the search phase, and/or the nodes and operations set output from a prior iteration of the update phase, as discussed above. In particular, the determination may include identifying a set of nodes based on the storage identifiers thereof, and determining that the set of nodes are all targeted for one or more of an insertion operation, a deletion operation, a merge operation, a split operation, an update operation, etc. as would be understood by a person having ordinary skill in the art upon reading the present descriptions.

In more preferred approaches, each node in the set of the one or more nodes occupies a same layer of the tree-based data structure.

Method 1200 further encompasses operation 1208, in which the one or more groups of the set of heterogeneous operations are applied. Importantly, the set of operations applied within each group are applied according to a predefined order. Preferably, the predefined order is the preferred order as set forth herein.

Of course, as will be understood by skilled artisans upon reading the present descriptions, the method 1200 may also include any number of additional functions and/or features as described herein. In various embodiments, the method 1200 may include any one or more of the following features and/or functionalities.

Advantageously, the presently disclosed inventive embodiments which include applying the set of heterogeneous operations to the set of nodes according to the predefined order improve the functioning of storage systems by: minimizing a number of structural modifications of the tree-based data structure; and reducing a size of an output nodes and operations set generated as a result of applying the set of heterogeneous operations to a particular layer of the tree-based data structure.

As noted generally above, the predefined order includes applying update operations, followed by deletion operations, followed by insertion operations. Accordingly, in one embodiment the method 1200 may include performing any update operations identified in the set of heterogeneous operations before performing any deletion operations identified in the set of heterogeneous operations, and performing any deletion operations identified in the set of heterogeneous operations before performing any insertion operations identified in the set of heterogeneous operations.

Similarly, and in more embodiments, the predefined order may include: performing any node re-balancing operations (e.g. transfer of entries, split or merge operations) after performing preferably all update, deletion and insertion operations identified in the set of heterogeneous operations for a specific node. Performing the node re-balancing is preferably performed in response to determining a node in the set of nodes is full or under-filled after performing the group of operations specified in the input.

In further approaches, the predefined order includes: performing a split operation in response to determining a node in the set of nodes becomes full in the course of performing the group of operations.

Moreover, as noted above in some embodiments the order of operations may be specified by a user, particularly when the operations are to be applied to a set of nodes storing data entries, and even more particularly when the operations are to be applied to a set of leaf nodes of a B+-tree during a first iteration of an update phase as described herein.

Accordingly, method 1200 may additionally and/or alternatively include overriding the predefined order in response to determining a user-provided order was specified in the input, the user-provided input corresponding to one or more of the set of heterogeneous operations to be applied to the tree-based data structure that store data entries.

Of course, the foregoing are merely exemplary embodiments of an inventive technique for isolating nodes for concurrent, bulk processing, and should not be considered limiting on the scope of the present disclosures.

Advantages

Using the foregoing inventive concepts, the presently disclosed techniques enable and provide a plethora of beneficial features, which singly and in combination operate to improve the functioning of conventional data storage systems, e.g. by reducing storage system access operations, I/O, and processor load. More specifically, the presently disclosed inventive concepts enable processing of heterogeneous types of operations in bulk, in a manner that is optimized for efficient concurrent processing of sets of heterogeneous operations. In addition, isolation of the processing of each node being processed in a current tree layer enables efficient concurrent bulk processing of operations. Further still, structural changes resulting from applying operations is minimized by defining a maximally efficient order of operations, contributing to the efficiency of the algorithm.

Accordingly, the presently disclosed inventive concepts fit well and provide a comprehensive solution for applications that use transactions to access and modify data structures, which is a very common architecture for many use cases and applications that accumulate operations and then possibly reduce the operations before applying to data structures. More specifically, the presently disclosed inventive concepts are applicable to the general family of paged search tree data structures, and provides a solution with a broad applicability scope to improve the efficiency of a widely used component in many applications. However, it should be understood that these disclosures present concepts applicable to many systems that use tree-based data structures, such as database systems, file systems, storage and deduplication systems, therefore having wide applicability.

It will be clear that the various features of the foregoing systems and/or methodologies may be combined in any way, creating a plurality of combinations from the descriptions presented herein.

It will be further appreciated that embodiments of the present invention may be provided in the form of a service deployed on behalf of a customer to offer service on demand.

While various embodiments have been described below, it should be understood that they have been presented by way of example only, and not limitation. Thus, the breadth and scope of a preferred embodiment should not be limited by any of the below-described exemplary embodiments, but should be defined only in accordance with the following claims and their equivalents.

What is claimed is:

1. A computer implemented method for concurrent processing of operations on a tree-based data structure, the method comprising:
   receiving input at a storage system managing a storage device in which the tree-based data structure is stored, the input identifying a set of heterogeneous operations to be applied to the tree-based data structure;
   determining one or more nodes of the tree-based data structure to which one or more of the set of heterogeneous operations are to be applied;
   determining one or more groups of the set of heterogeneous operations according to the one or more nodes to which the set of heterogeneous operations are to be applied; and applying, for each of the one or more groups, the set of heterogeneous operations according to a predefined order, wherein the predefined order comprises:
   performing any update operations identified in the set of heterogeneous operations before performing any deletion operations identified in the set of heterogeneous operations, and
   performing any deletion operations identified in the set of heterogeneous operations before performing any insertion operations identified in the set of heterogeneous operations.

2. The method as recited in claim 1, wherein applying the set of heterogeneous operations according to the predefined order:
   minimizes a number of structural modifications of the tree-based data structure; and
   reduces a size of an output nodes and operations set generated as a result of applying the set of heterogeneous operations to a particular layer of the tree-based data structure.

3. The method as recited in claim 1, wherein the predefined order comprises:
   performing any node re-balancing operations for the one or more nodes to which the group of heterogeneous operations are to be applied after performing all operations identified in the group of heterogeneous operations for the node.

4. The method as recited in claim 3, wherein performing the node re-balancing is performed in response to determining at least one of the one or more nodes to which the group of heterogeneous operations are to be applied is under-filled after performing the group of heterogeneous operations.

5. The method as recited in claim 1, wherein the predefined order comprises:
   performing any merge operations for at least one of the one or more nodes to which the heterogeneous operations are to be applied after performing all operations identified in the group of heterogeneous operations for a node.

6. The method as recited in claim 5, wherein performing the merge operations is performed in response to determining at least one of the one or more nodes to which the group of heterogeneous operations are to be applied is under-filled after performing the group of heterogeneous operations.

7. The method as recited in claim 1, wherein the predefined order comprises:
   performing a split or node re-balancing operations in response to determining at least one of the one or more nodes to which the group of heterogeneous operations are to be applied becomes full in the course of performing the group of heterogeneous operations.

8. The method as recited in claim 1, comprising overriding the predefined order in response to determining a user-provided order was specified in the input, the user-provided order corresponding to one or more of the set of heterogeneous operations to be applied to one or more nodes of the tree-based data structure.

9. The method as recited in claim 1, wherein applying the set of heterogeneous operations is performed concurrently and in bulk for each layer of the tree-based data structure.

10. A computer program product for concurrent processing of operations on a tree-based data structure the computer program product comprising a computer readable storage medium having program instructions embodied therewith, wherein the computer readable storage medium is not a transitory signal per se, and the program instructions are executable by a storage system manager to cause the storage system manager to perform a method comprising:
   receiving input at a storage system manager managing a storage device in which the tree-based data structure is stored, the input identifying a set of heterogeneous operations to be applied to the tree-based data structure;
   determining, by the storage system manager, one or more nodes of the tree-based data structure to which one or more of the set of heterogeneous operations are to be applied;
   determining, by the storage system manager, one or more groups of the set of heterogeneous operations according to the one or more nodes to which the set of heterogeneous operations are to be applied; and
   applying, by the storage system manager and for each of the one or more groups, the set of heterogeneous operations according to a predefined order;
   wherein the predefined order comprises:
      performing any update operations identified in the set of heterogeneous operations before performing any deletion operations identified in the set of heterogeneous operations; and
      performing any deletion operations identified in the set of heterogeneous operations before performing any insertion operations identified in the set of heterogeneous operations.

11. The computer program product as recited in claim 10, wherein applying the set of heterogeneous operations to the one or more nodes to which the set of heterogeneous operations are to be applied according to the predefined order:
   minimizes a number of structural modifications of the tree-based data structure; and
   reduces a size of an output nodes and operations set generated as a result of applying the set of heterogeneous operations to a particular layer of the tree-based data structure.

12. The computer program product as recited in claim 10, wherein the predefined order comprises: performing any node re-balancing operations after performing any insertion operations identified in the set of heterogeneous operations.

13. The computer program product as recited in claim 10, comprising program instructions executable by the storage system manager to cause the storage system manager to perform the node re-balancing in response to determining a node in the one or more nodes to which the set of heterogeneous operations are to be applied is under-filled after performing the group of heterogeneous operations.

14. The computer program product as recited in claim 10, wherein the predefined order comprises: performing any merge operations after performing any insertion operations identified in the set of heterogeneous operations.

15. The computer program product as recited in claim 10, comprising program instructions executable by the storage system manager to cause the storage system manager to perform the node re-balancing is performed in response to determining a node in the one or more nodes to which the set of heterogeneous operations are to be applied is under-filled after performing the group of operations.

16. The computer program product as recited in claim 10, wherein the predefined order comprises: performing a split operation in response to determining a node in the one or more nodes to which the set of heterogeneous operations are to be applied becomes full while performing the group of operations.

17. The computer program product as recited in claim 10, comprising program instructions executable by the storage system manager to cause the storage system manager to override the predefined order in response to determining a user-provided order was specified in the input, the user-provided order corresponding to one or more of the set of heterogeneous operations to be applied to one or more nodes of the tree-based data structure that store data entries.

18. A storage system for concurrent processing of operations on a tree-based data structure comprising a root node layer, a first node layer below the root node layer, and a second node layer below the first node layer, the storage system comprising a storage system manager, and logic integrated with and/or executable by the storage system manager, the logic being configured to cause the storage system to:
  receive input at a storage system managing a storage device in which the tree-based data structure is stored, the input identifying a set of heterogeneous operations to be applied to one or more nodes of the tree-based data structure;
  determine the one or more nodes of the tree-based data structure to which one or more of the set of heterogeneous operations are to be applied;
  determine one or more groups of the set of heterogeneous operations that are to be applied to a common set of the one or more nodes; and
  apply, for each of the one or more groups, the set of heterogeneous operations to the one or more nodes to which the set of heterogeneous operations are to be applied by the storage system manager and according to a predefined order;
  wherein the predefined order comprises:
    performing any update operations identified in the set of heterogeneous operations before performing any deletion operations identified in the set of heterogeneous operations; and
    performing any deletion operations identified in the set of heterogeneous operations before performing any insertion operations identified in the set of heterogeneous operations.

19. The system as recited in claim 18, wherein the logic configured to cause the storage system manager to apply the set of heterogeneous operations to the one or more nodes to which the set of heterogeneous operations are to be applied according to the predefined order comprises logic configured to cause the storage system manager to:
  minimize a number of structural modifications of the tree-based data structure; and
  reduce a size of an output nodes and operations set generated as a result of applying the set of heterogeneous operations to a particular layer of the tree-based data structure.

20. The system as recited in claim 18, wherein the predefined order further comprises: performing any node re-balancing operations after performing any insertion operations identified in the set of heterogeneous operations.

21. The system as recited in claim 18, comprising logic configured to cause the storage system manager to perform the node re-balancing is performed in response to determining a node in the one or more nodes to which the set of heterogeneous operations are to be applied is under-filled after performing the group of heterogeneous operations.

22. The system as recited in claim 18, wherein the predefined order further comprises: performing any merge operations after performing any insertion operations identified in the set of heterogeneous operations.

23. The system as recited in claim 18, comprising logic configured to cause the storage system manager to perform the node re-balancing in response to determining a node in the one or more nodes to which the set of heterogeneous operations are to be applied is under-filled after performing the group of heterogeneous operations.

24. The computer program product as recited in claim 18, wherein applying the set of heterogeneous operations is performed concurrently and in bulk for each layer of the tree-based data structure.

25. The system as recited in claim 18, wherein applying the set of heterogeneous operations is performed concurrently and in bulk for each layer of the tree-based data structure.

* * * * *